(12) United States Patent
Hruska et al.

(10) Patent No.: US 7,313,904 B2
(45) Date of Patent: Jan. 1, 2008

(54) V-RAKE

(75) Inventors: Kevin Hruska, Gerald (CA); Dean Baragar, Esterhazy (CA); Raymond Helmeczi, Esterhazy (CA)

(73) Assignee: Bridgeview Mfg. Inc., Gerald, Saskatchewan (CA)

( * ) Notice: Subject to any disclaimer, the term of this patent is extended or adjusted under 35 U.S.C. 154(b) by 0 days.

(21) Appl. No.: 11/311,014

(22) Filed: Dec. 19, 2005

(65) Prior Publication Data

US 2006/0185342 A1    Aug. 24, 2006

Related U.S. Application Data

(60) Provisional application No. 60/662,382, filed on Mar. 17, 2005, provisional application No. 60/654,940, filed on Feb. 23, 2005.

(51) Int. Cl.
*A01D 76/00* (2006.01)
*A01D 78/00* (2006.01)
*A01D 80/00* (2006.01)
*A01D 84/00* (2006.01)

(52) U.S. Cl. ................................... 56/378

(58) Field of Classification Search ............... 56/378, 56/370, 365, 385, 396, 380, 384, 397
See application file for complete search history.

(56) References Cited

U.S. PATENT DOCUMENTS

| | | | |
|---|---|---|---|
| 4,183,198 A | 1/1980 | Sligter |
| 4,324,093 A | 4/1982 | Van der Lely |
| 4,446,685 A | 5/1984 | Coeffic |
| 4,977,734 A | 12/1990 | Rowe et al. |
| 5,062,260 A | 11/1991 | Tonutti |
| 5,065,570 A | 11/1991 | Kuehn |
| 5,199,252 A | 4/1993 | Peeters |
| 5,305,590 A | 4/1994 | Peeters |
| 5,493,853 A | 2/1996 | Tonutti |
| 5,546,739 A | 8/1996 | Hettich |

(Continued)

FOREIGN PATENT DOCUMENTS

CA    592171    2/1960

(Continued)

*Primary Examiner*—Árpád Fábián Kovács
(74) *Attorney, Agent, or Firm*—Dinsmore & Shohl LLP

(57) ABSTRACT

The V-rake has an elongated tow beam with a front end adapted to be connected to a towing vehicle and a back end fixed to a back section, the back section is supported by a wheel assembly, which may be a set of tandem wheels. The V-rake further includes first and second rake booms each having a front end and a back end pivotally connected to the back section such that the front ends of the booms can be swung between a transport position and an operating position. The front end of each boom has at least one castor wheel for support. The back section is further adapted to controllably change the distance between the back ends of the booms to adjust the width of a resulting windrow. A number of rake wheels are mounted on each of the rake booms on the side of the boom nearest to the tow beam, wherein the rake wheels are adapted to move vertically with respect to the rake boom using a compression spring mechanism. The rake wheel includes a center disk, an outer ring and tines passing through the outer ring with the ends of the tines individually fixed to the center disk, and may further include a windguard.

37 Claims, 29 Drawing Sheets

U.S. PATENT DOCUMENTS

| | | |
|---|---|---|
| 5,598,691 A | 2/1997 | Peeters |
| 5,685,135 A | 11/1997 | Menichetti |
| 5,752,375 A | 5/1998 | Tonutti |
| 5,899,055 A | 5/1999 | Rowse |
| 5,918,452 A | 7/1999 | Kelderman |
| 5,960,620 A | 10/1999 | Wright et al. |
| 6,000,207 A | 12/1999 | Menichetti |
| 6,038,844 A | 3/2000 | Peeters et al. |
| 6,151,877 A | 11/2000 | Rowse |
| 6,212,866 B1 | 4/2001 | Rowse |
| 6,220,008 B1 | 4/2001 | Rowse et al. |
| 6,314,710 B1 | 11/2001 | Tonutti |
| 6,405,517 B1 | 6/2002 | Peeters et al. |
| 6,543,212 B2 | 4/2003 | Tonutti |
| 6,823,656 B1 | 11/2004 | Domgaard |
| 6,834,488 B2 | 12/2004 | Menichetti |
| 6,892,520 B2 | 5/2005 | Rowse et al. |
| 6,948,301 B2 | 9/2005 | Rowse et al. |
| 2002/0069634 A1 | 6/2002 | Tonutti |
| 2002/0157371 A1 | 10/2002 | Van Den Angel |
| 2004/0083705 A1 | 5/2004 | Tonutti |
| 2004/0093843 A1 | 5/2004 | Tonutti |
| 2005/0076630 A1* | 4/2005 | Tonutti ........................ 56/378 |

FOREIGN PATENT DOCUMENTS

| | | |
|---|---|---|
| CA | 651178 | 10/1962 |
| CA | 669255 | 8/1963 |
| CA | 711011 | 6/1965 |
| CA | 875840 | 7/1971 |
| CA | 1202492 | 4/1986 |
| CA | 1288601 | 9/1991 |
| CA | 2060813 | 3/1997 |
| CA | 2277299 | 11/2000 |

* cited by examiner

US 7,313,904 B2

V-RAKE

This application claims the benefit of U.S. Provisional Patent Application Ser. No. 60/654,940 filed Feb. 23, 2005 and Ser. No. 60/662,382 filed Mar. 17, 2005.

FIELD OF INVENTION

The present invention relates generally to wheel rakes and more particularly to V-rakes.

BACKGROUND OF THE INVENTION

V-rakes have been found to be an effective farm implement for gathering cut agricultural materials into windrows. The V-rake generally includes a primary frame, with a front end adapted to be hitched to a tractor and a back end. A pair of rake arms, which are pivotally connected at the back end of the primary frame, are controlled such that they may be positioned adjacent the primary frame in a closed or traveling position or extended in the form of a V in the opened or raking position. The V-rake is supported by a number of rolling wheels mounted on the primary frame and on the rake arms. Further, each rake arm includes a number of rake wheels, which may be raised when the V-rake is in the traveling position, and lowered when the V-rake is in the raking position.

Examples of rakes are described in U.S. Pat. No. 4,324,093 issued Apr. 13, 1962 to van der Lely et al; U.S. Pat. No. 5,039,528 issued Nov. 19, 1971; U.S. Pat. No. 5,199,252 issued on Apr. 6, 1993 to Peeters; U.S. Pat. No. 5,343,643 issued Feb. 27, 1996 to Tonitti; U.S. Pat. No. 5,498,271 issued on Feb. 4, 1997 to Peeters; 5,699,045 issued on May 4, 1999 to Rowse et al; U.S. Pat. No. 6,220,008 issued April 24 to Rowse et al and US Patent Publication 2004/0063265 published May 6, 2004 to Tonutti.

In addition to the description of the basic rakes, these references also describe a variety of rake wheels, as well as control mechanisms for opening and closing the rakes, for raising and lowering the rake wheels, and for adjusting the rake to vary the width of the windrows.

Though these rakes have been in use for some time, it has been found that they do not always satisfy the needs of farmers and ranchers in view of their inherent complexity of operation and their weaknesses. This is particularly true where the rake wheels and the spring assemblies for controlling the height of the rake wheels are concerned. It has also been found that existing mechanisms for adjusting the width of the windrow produced by the rake are ponderous.

As an example, prior art rake wheel assemblies include a center disk with a hub opening and bolt holes by which the rake wheel assembly is attached to a hub. The rake wheel assembly further includes an outer ring with a series of holes equally spaced around its circumference for receiving rake teeth or tines. One end of each tine slides through one of the holes in the outer ring, while plates that are fixed to the center disk by bolts each sandwich the other end of a number of tines. When one of the tines in this rake wheel assembly has to be replaced, the retainer plate has to be removed. When the retainer plate is removed, all of the tines held by the plate become loose and can then fall out of the rake wheel assembly. This process can be very inconvenient, particularly in the field when the rake wheel assembly is in a vertical position.

Further, it has been found that the material being raked has a tendency to wrap itself on the rake wheel assembly due to the spacing between the tines. Attempts have been made to remedy this situation by attaching a piece of hard plastic to the tines on the outside of the rake wheel assembly, however this is not found to be fully satisfactory.

Therefore there is a need for an improved, reliable and easy to operate V-rake.

SUMMARY OF THE INVENTION

The present invention is directed to a V-rake that has an elongated tow beam with a front end adapted to be connected to a towing vehicle and a back end fixed to a back section, the back section is supported by a wheel assembly. The V-rake further includes first and second rake booms each having a front end and a back end pivotally connected to the back section such that the front ends of the booms can be swung between a transport position wherein the rake booms are generally parallel to the tow beam and an operating position wherein the booms are positioned at a predetermined angle to the tow beam, using a control mechanism. The front end of each boom has at least one castor wheel for support. A number of rake wheels are mounted on each of the rake booms on the side of the boom nearest to the tow beam, wherein the rake wheels are adapted to move vertically with respect to the rake boom. The back section is further adapted to controllably change the distance between the back ends of the booms.

In accordance with another aspect of the invention, the back section comprises first and second vertical beams each having lower and upper ends and a mechanism connected between the first and second vertical beams that is adapted to change the distance between the first and second vertical beams.

In accordance with a further aspect of the invention, the back section comprises first and second vertical beams each having lower and upper ends, the rake booms being pivotally connected to, the vertical beams between their lower and upper ends, a first horizontal beam has one end fixed to the upper end of the first vertical beam and a second horizontal beam has one end fixed to the upper end of the second vertical beam such that the other ends of the horizontal beams are positioned end to end, and a third horizontal beam positioned adjacent the first and second horizontal beams, the tow beam being fixed substantially to the center of the third horizontal beam. The back section further includes a control mechanism connected between the third beam and the first and second beams to move the first and second beams in a direction parallel to the third beam to change the distance between the first and second vertical beams.

In accordance with an alternate aspect of the invention, the back section comprises first and second vertical beams each having lower and upper ends, a horizontal beam is fixed between the upper ends of the first and second vertical beams, and first and second pivot boxes, which each have a predetermined width between one side and another side of the pivot box. The one side of the first pivot box is pivotally connected to the first vertical beam between the lower and upper ends and the first rake boom is pivotally connected to the other side of first pivot box; similarly the one side of the second pivot box is pivotally connected to the second vertical beam between the lower and upper ends and the second rake boom is pivotally connected to the other side of second pivot box. A pivot box control mechanism is adapted to move the other sides of the pivot boxes towards and away from one another to change the distance between the back ends of the booms. The pivot box control mechanism may comprise a horizontal control beam fixed between the first and second vertical beams and below the horizontal beam, a sleeve slidably mounted on the horizontal control beam, first and second linkages pivotally connected between the sleeve and the other sides of the of the pivot boxes and a hydraulic cylinder connected between the sleeve and the tow beam to control the movement of the sleeve along the horizontal control beam.

In accordance with another aspect of the invention, the back section wheel assembly includes a first wheel rotatably fixed to the lower end of the first vertical beam and a second wheel rotatably fixed to the lower end of the second vertical beam. Alternately, the wheel assembly may include a first set of tandem wheels pivotally fixed to the lower end of the first vertical beam and a second set of tandem wheels pivotally fixed to the lower end of the second vertical beam. Each set of tandem wheels has a wheel carriage and a pair of wheels mounted by axles onto the carriage such that the wheels are in parallel and staggered front to back relative to one another, wherein the front wheel is positioned on the inside of the V-rake and the back wheel is positioned on the outside of the V-rake. The carriage is pivotally fixed to the vertical beam at a pivot point, wherein a distance between the pivot point and the axle of the front wheel is greater than a distance between the pivot point and the axle of the back wheel.

In accordance with a further aspect of the invention, the rake wheels are connected to the rake booms by rake wheel arms, which are controlled by spring assemblies that permit the wheels to move vertically with respect to the rake boom.

In accordance with a specific aspect of the invention, the spring assembly comprises a compression spring having first and second ends, a plug fixed to the first end of the spring, an insert fixed to the second end of the spring, the insert has an arm extending from it. A rod that has a first end and a second end is positioned within the compression spring wherein the first end is fixed to the plug and the second end extends out of the second end of the spring through the insert, such that the insert slides freely on the rod. The second end of the rod is adapted to be connected to a mechanism to control its movement. The spring assembly further includes an arm that has first and second ends, the first end is fixed to the rake wheel arm and the second end is pivotally connected to the insert arm, whereby the compression spring permits the rake wheel to move vertically to follow a terrain contour.

In accordance with another aspect of the invention, the rake wheel comprises a center disk having a predetermined radius and adapted to be mounted on a hub, a number of rake tines and an outer ring having a substantially greater radius then the center disk and having holes at least equal to the number of rake tines. The holes In the outer ring are spaced about and passing radially through the outer ring, whereby each of the tines is positioned in a hole in the outer ring with one end of each tine fixed to the center disk. The center disk may have holes at least equal in number to the rake tines spaced about its periphery for receiving fasteners to individually fix the tines to the center disk.

In accordance with a further specific aspect of the invention, the rake wheel includes a windguard positioned between the center disk and the outer ring. The windguard consists of an annulus having an outer radius approximately equal to the radius of the outer ring and an inner radius smaller then the radius of the center ring so as to overlap with the center ring. The inner periphery of the annulus has holes that match with the holes in the center disk, and the outer periphery of the annulus has tabs with holes that match with some of the holes in the outer ring, the tabs are substantially perpendicular to the surface of the annulus, whereby rake tines are located in the outer ring holes and matching tab holes. The windguard may be made from a light gauge galvanized metal with stamped indentations.

Aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION

A V-rake has a pair of rake wheel booms on which rake wheels are mounted, and the size of the V-rake is normally identified by the number of rake wheels that are mounted on the rake wheel booms. For instance, an 8-wheel rake has four rake wheels on each boom, a 10-wheel rake has five rake wheels on each boom, and so on. In order to simplify the manufacturing process for V-rakes while at the same time providing a variety of V-rake sizes, V-rakes having 8, 12 and 16 rake wheels use the same main boom as the V-rakes having 10, 14, and 18 rake wheels, however the booms are each lengthened by a boom extension on which one rake wheel is mounted. However, this type of modular construction is described by way of example only, and other boom arrangements are within the scope of the present invention.

Figure 1:
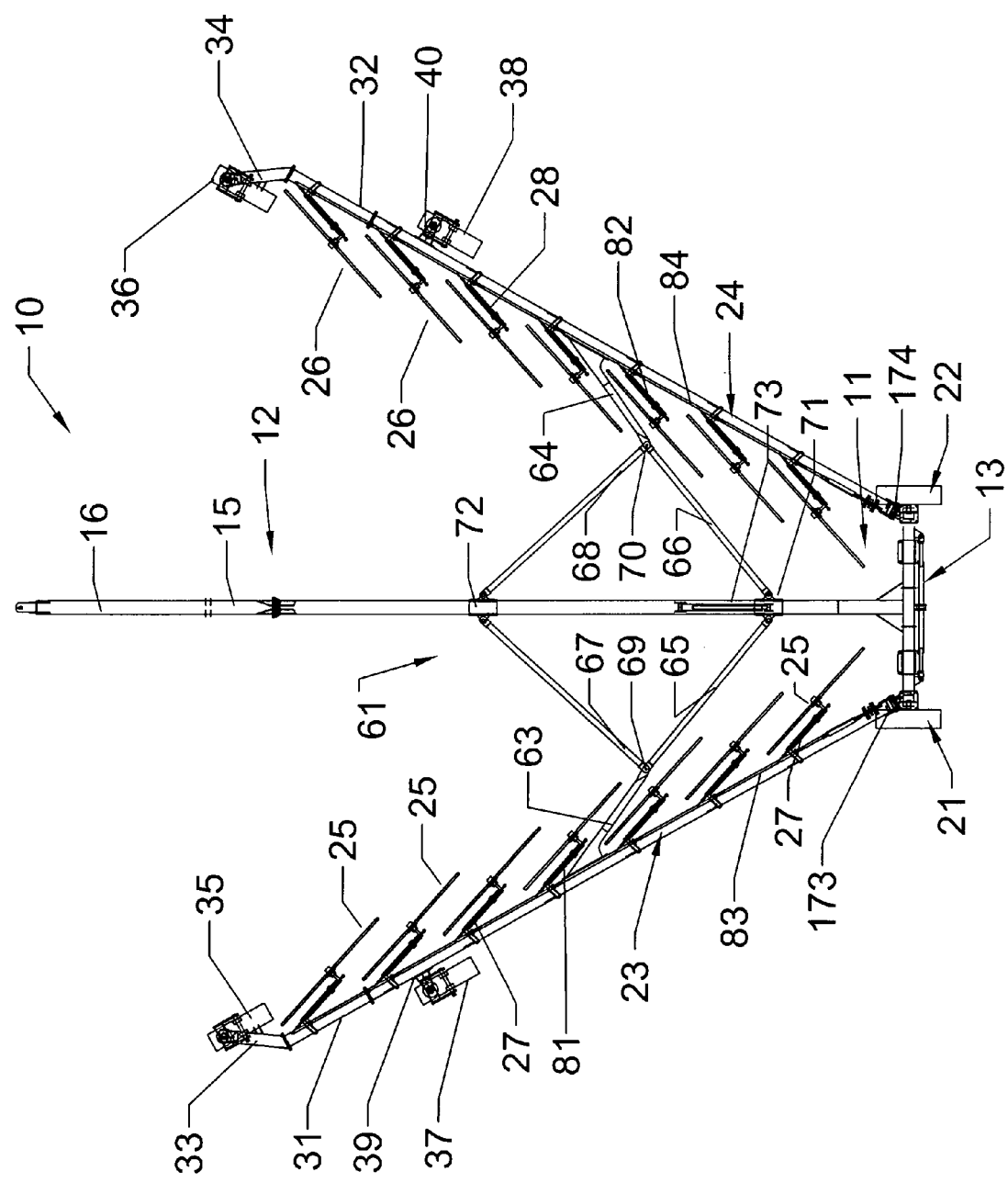
FIG. 1 illustrates in top view one embodiment of the V-rake while in the open position in accordance with the present invention.
Figure 2:
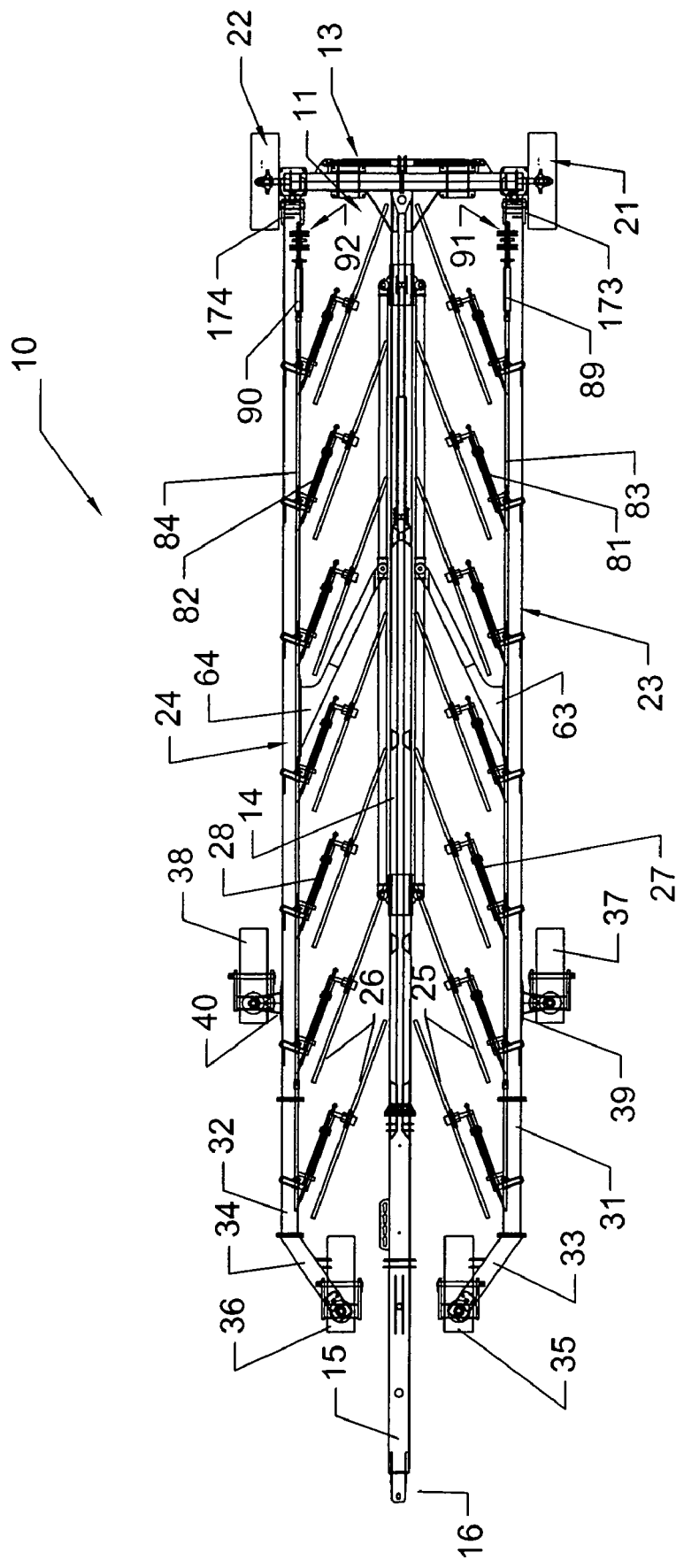
FIG. 2 illustrates in top view the V-rake of FIG. 1 while in the closed position.
Figure 3:
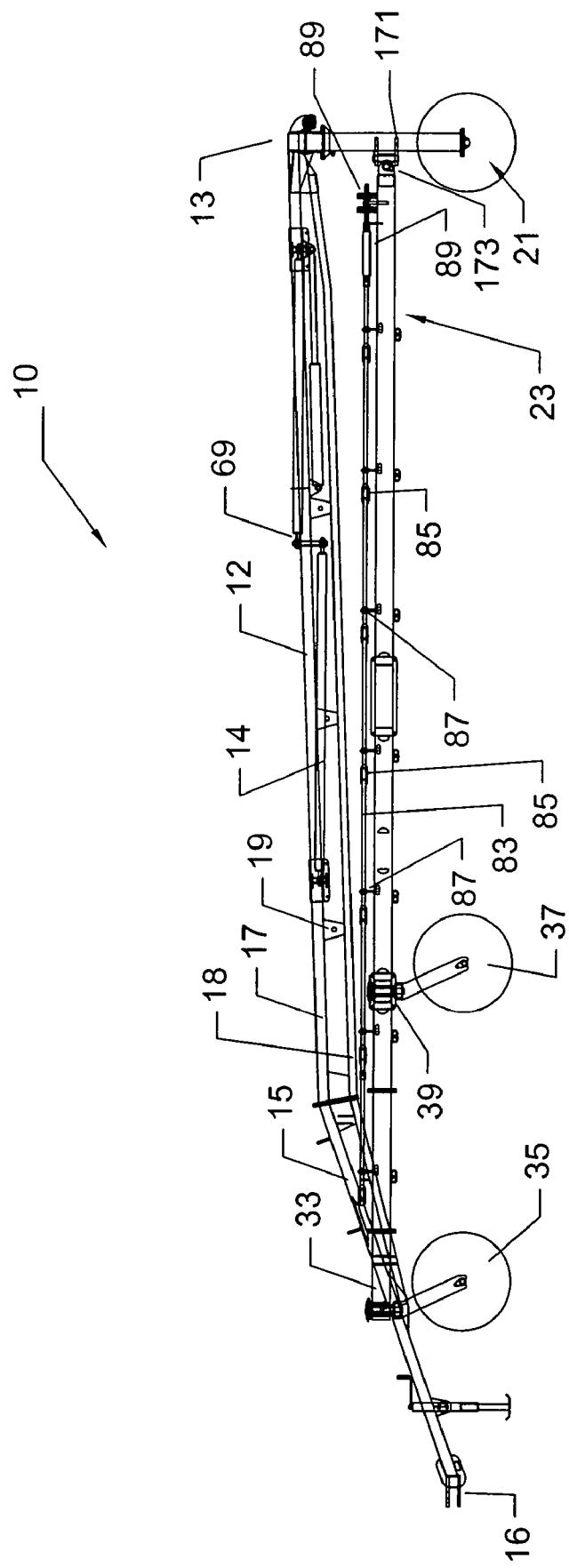
FIG. 3 illustrates the V-rake of FIG. 1 in side view.
Figure 4:
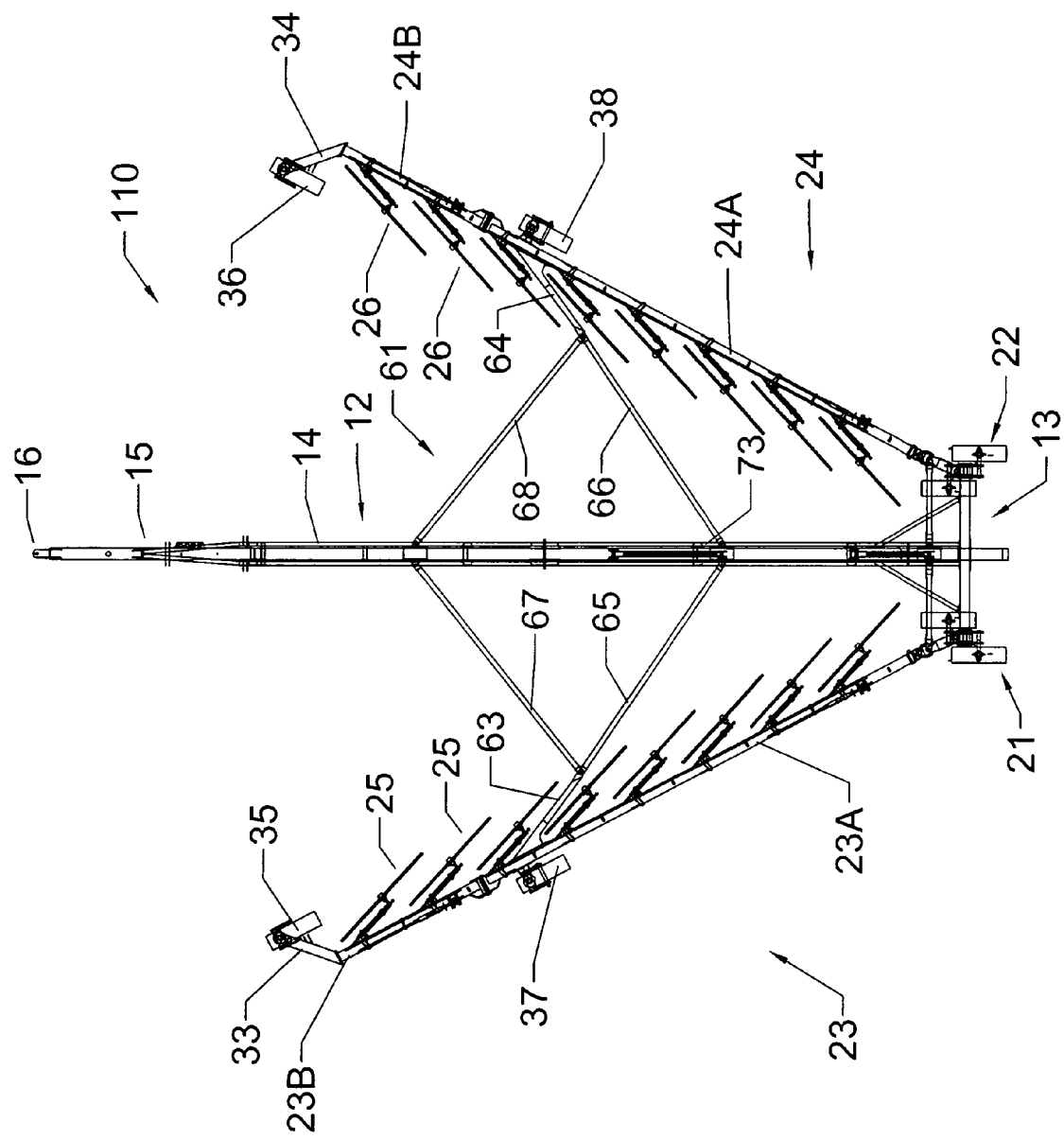
FIG. 4 illustrates in top view another embodiment of the V-rake positioned to produce a wide windrow.
Figure 5:
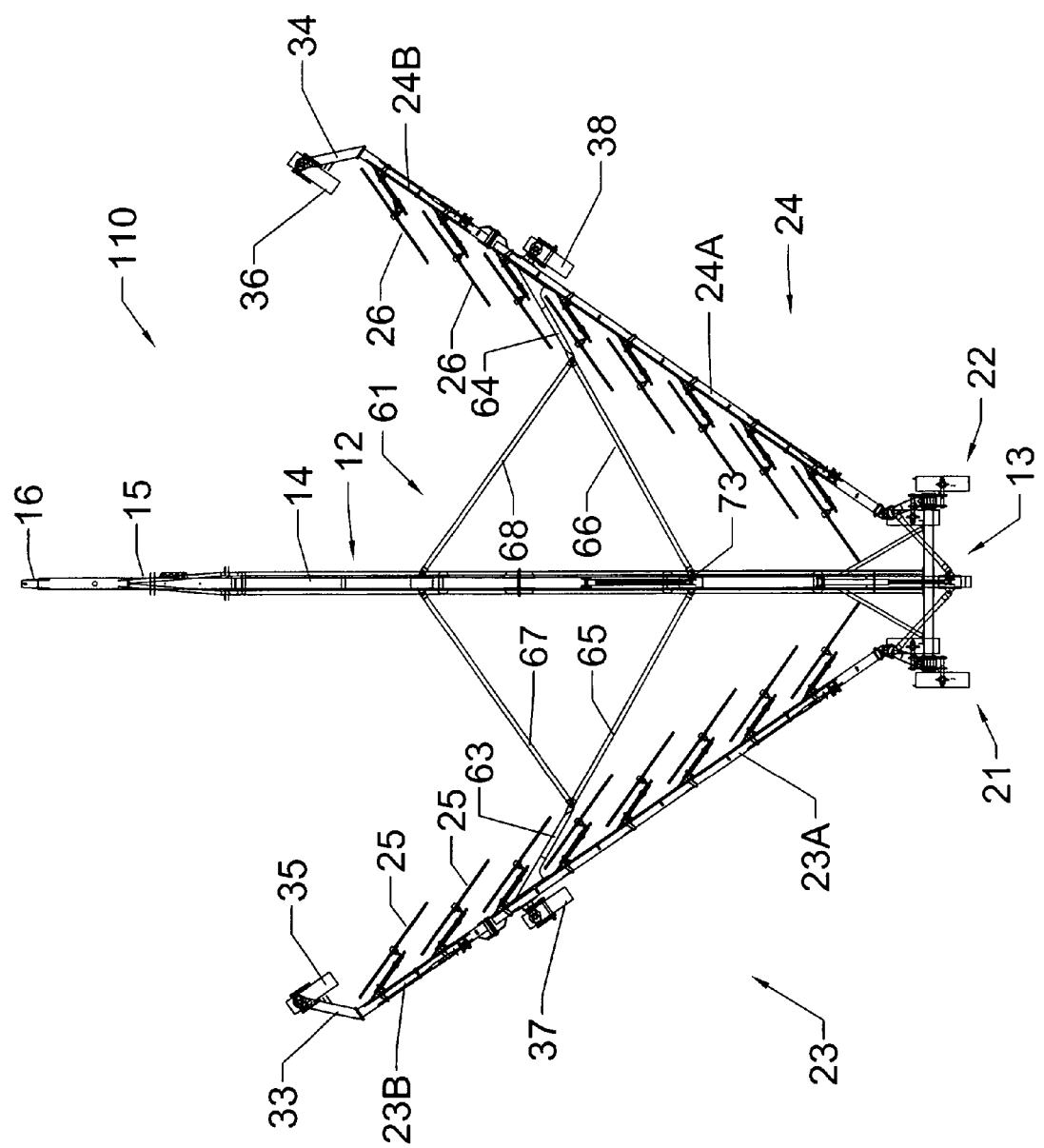
FIG. 5 illustrates in top view the V-rake of FIG. 4 positioned to produce a narrow windrow.
Figure 6:
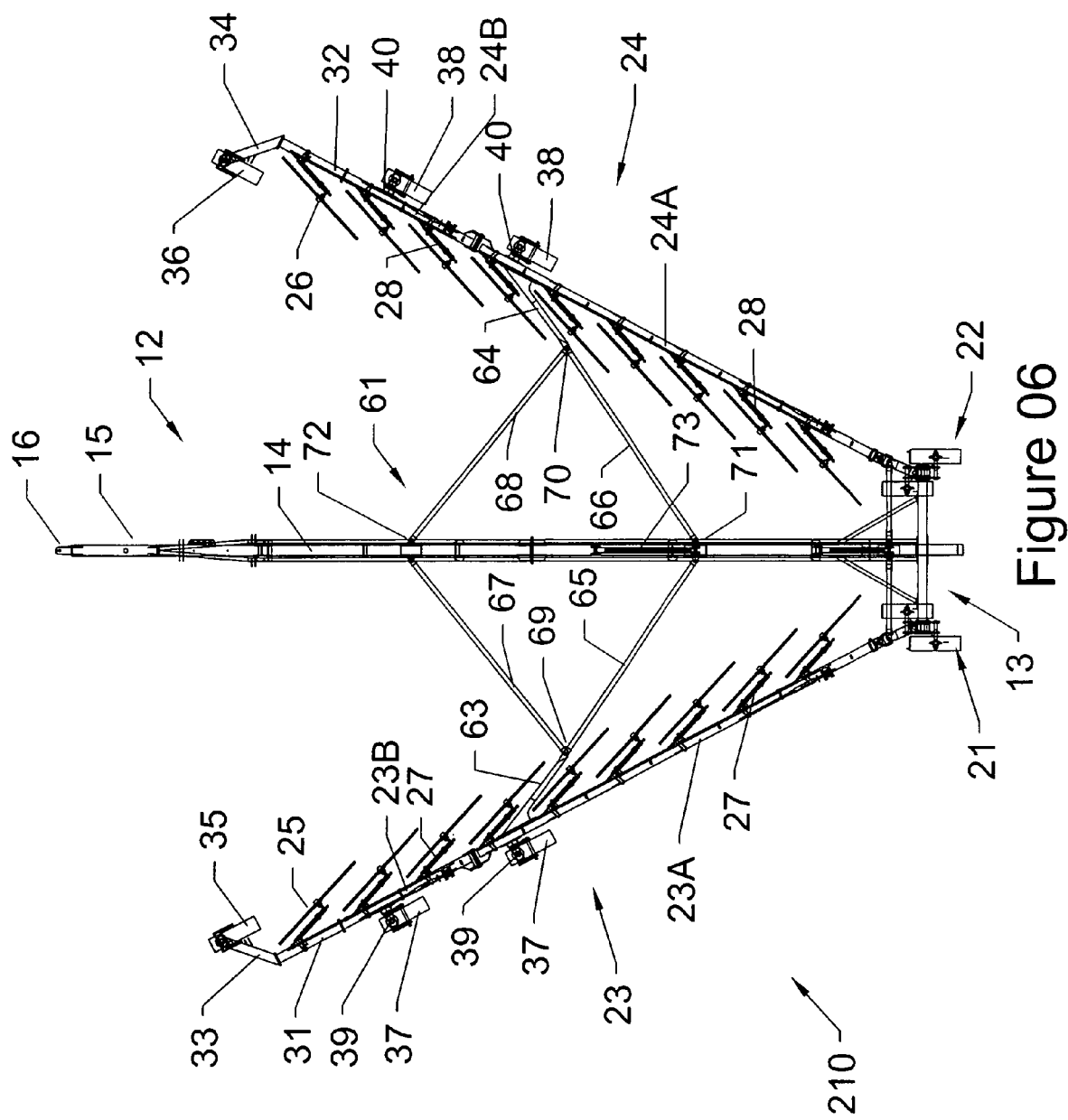
FIG. 6 illustrates in-top view a further embodiment of the V-rake positioned to produce a wide windrow.
Figure 7:
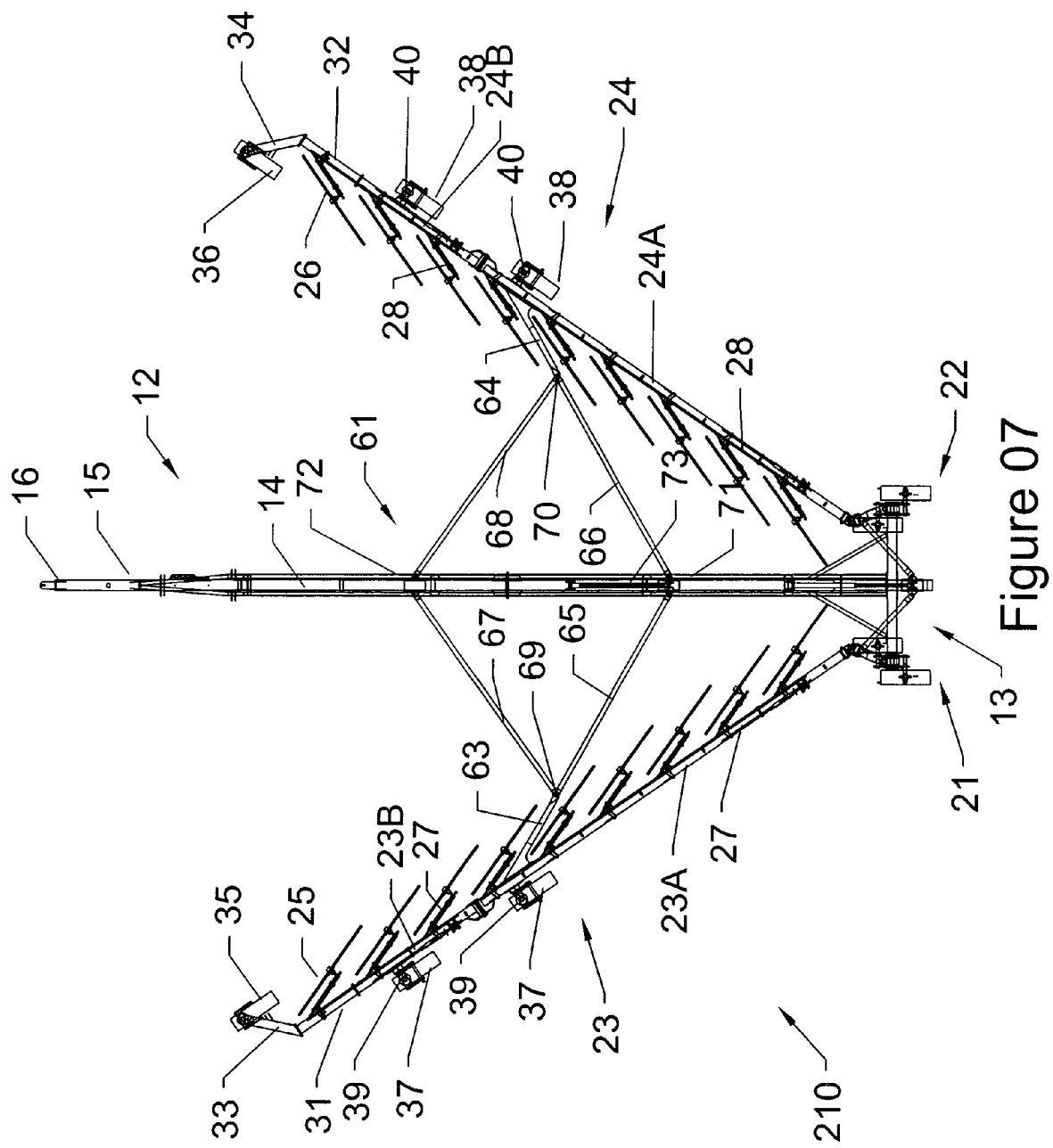
FIG. 7 illustrates in top view the V-rake of FIG. 6 positioned to produce a narrow windrow.
Figure 8:
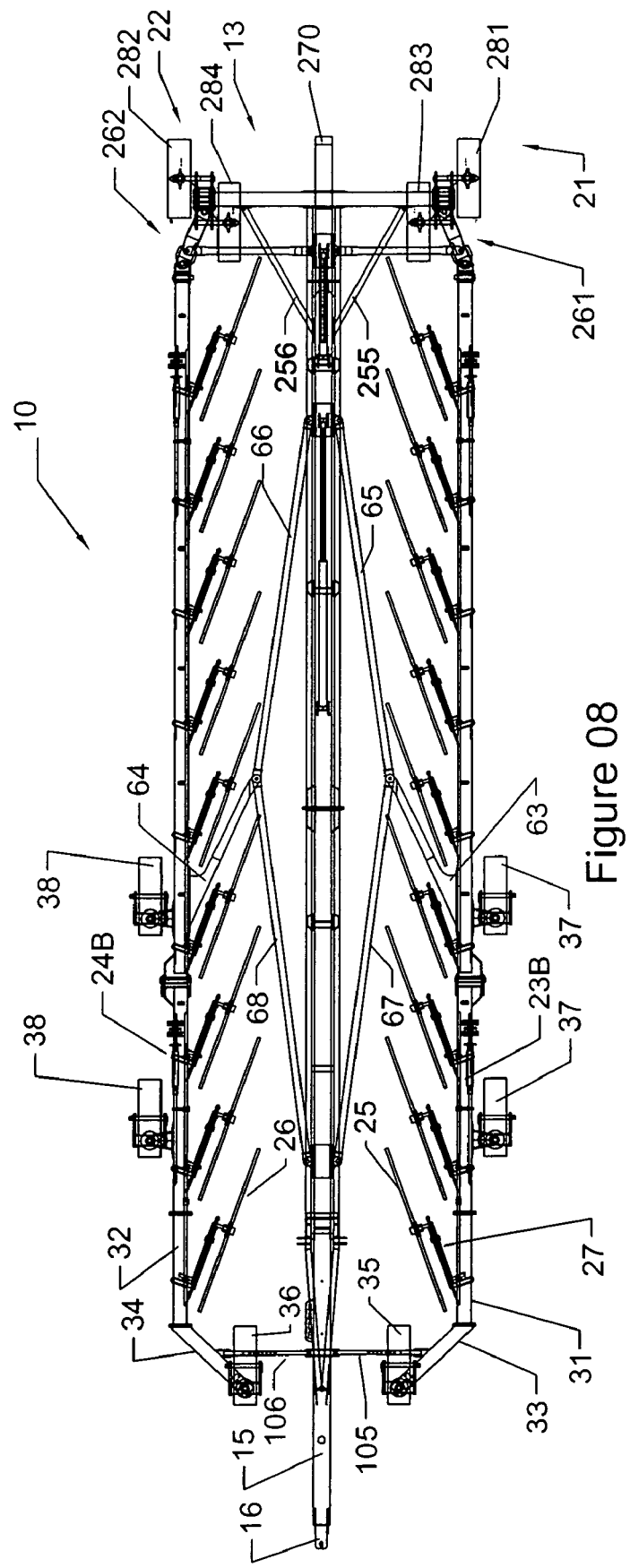
FIG. 8 illustrates in top view the V-rake of FIG. 6 in the transport position.
Figure 9:
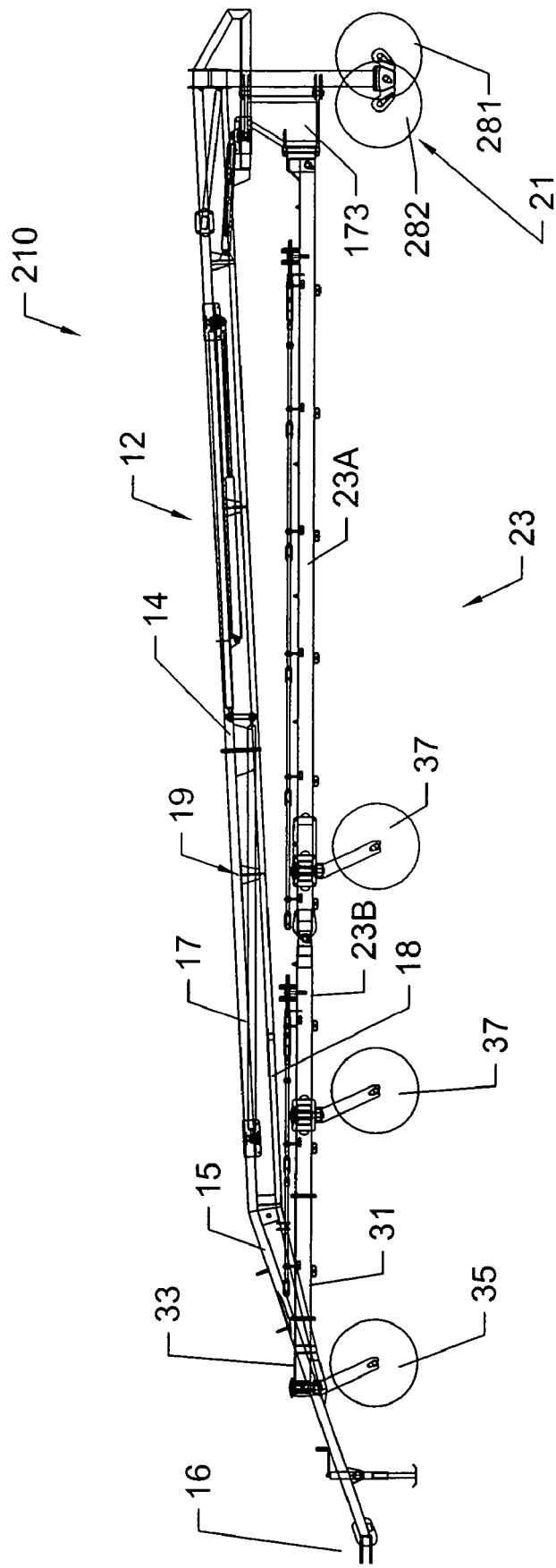
FIG. 9 illustrates the V-rake of FIG. 6 in side view.
Figure 10:
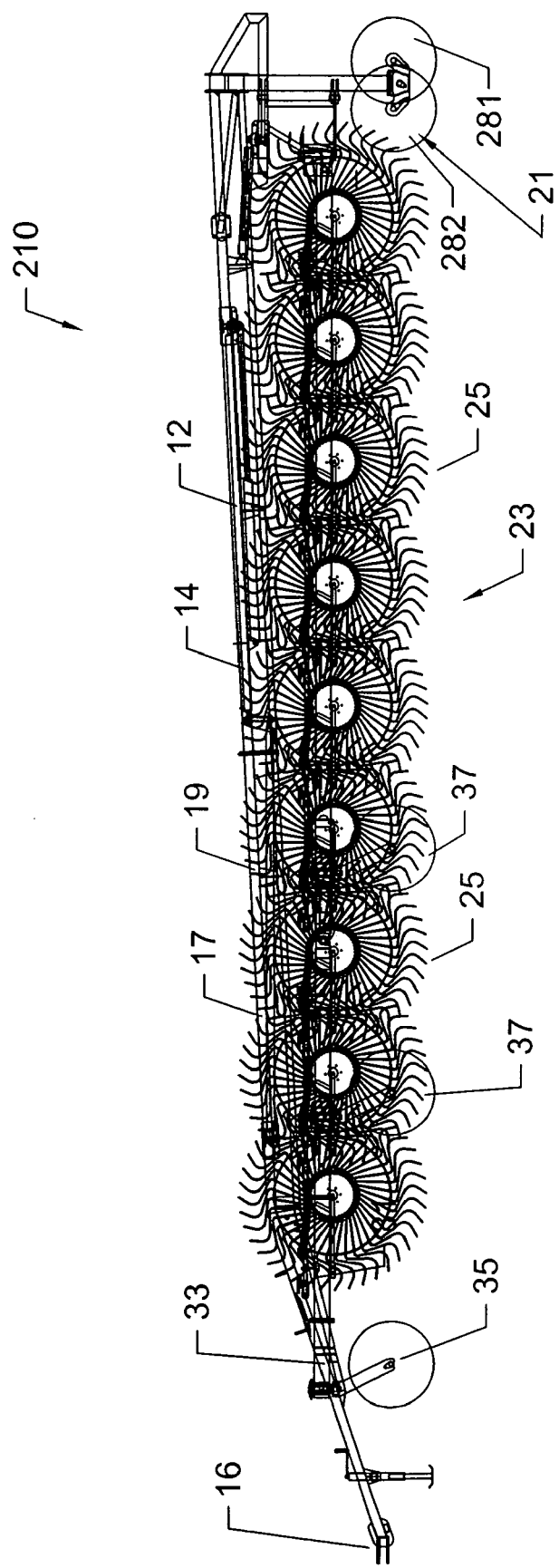
FIG. 10 illustrates the V-rake of FIG. 6 in side view with mounted rake wheels.

With reference to the drawings, three V-rake arrangements, namely V-rake 10, V-rake 110, and V-rake 210, will be described. FIGS. 1 and 2 illustrate a top view of V-rake 10, which is a 14-wheel rake, in the open or operating position and in the closed or transport position, respectively and FIG. 3 illustrates a side view of V-rake 10. However, in order to simplify the drawing,.the rake wheels are not shown on FIG. 3. FIGS. 4 and 5 illustrate top views of an open V-rake 110, which is a 16-wheel rake. The V-rake booms in FIG. 4 are positioned to form a wide windrow and the V-rake booms in FIG. 5 are positioned to form a narrow windrow. FIGS. 6 and 7 illustrate top views of V-rake 210, which is an 18-wheel rake. The V-rake booms in FIG. 6 are positioned to form a wide windrow and the V-rake booms in FIG. 7 are positioned to form a narrow windrow. FIG. 8 illustrates a closed 18-wheel rake in top view, and FIGS. 9 and 10 illustrate the 18-wheel rake in side view with and without the rake wheels respectively. In order to maintain clarity in the description of the various V-rakes, components common to all of the V-rakes with be identified by the same reference numbers.

V-rake 10, 110 and 210 includes a frame structure 11 having a tow beam 12 fixed at the back end to a back section 13. The tow beam 12 includes a main beam section 14 and a goose neck section 15, which is terminated by a hitch tongue 16. The main beam section 14 and the goose neck section 15 may be made from a single square or rectangular beam, or as shown in FIGS. 3 and 9, the main beam section 14 with the goose neck section 15 may be made from a beam 17 and a truss support 18 which are connected together by truss plates 19 in order to strengthen the tow beam 12 without adding undue weight.

The back section 13, two embodiments of which will be described in detail in conjunction with FIGS. 19 to 23, is supported by a pair of wheel assemblies 21, 22. Further, the V-rake 10, 110, 210 includes rake booms 23, 24 that are pivotally connected to the rear section 13, which permits the booms 23, 24 to pivot in a horizontal plane so that the V-rake 10, 110, 210 may be opened and closed. Rake wheels 25 and 26 are mounted on the inside of the rake booms 23 and 24 respectively using wheel arms 27 and 28.

V-rake 10 in FIGS. 1 to 3, which is a 14-wheel rake includes booms 23, 24 of the type that may also be used for a 12-wheel rake, but that is extended in length using single wheel rake boom extensions 31, 32. The V-rake 110 in FIGS. 4 and 5, which is a 16-wheel rake includes booms 23, 24 without any extensions. However in view of the length of the booms 23, 24 in V-rake 110, which can cause stresses in the booms 23, 24 as the V-rake 110 tries to follow the contour of the terrain, the booms 23, 24 may be be made up of sections 23A, 23B and sections 24A, 24B, which are hinged together using knuckle hinges 100. Six rake wheels are mounted on each of the main boom sections 23A, 24A, while two rake wheels are mounted on each of the hinged boom sections 23B, 24B. The hinge 100 mechanism is described in greater detail in conjunction with FIGS. 14 and 15. V-rake 210 illustrated in FIGS. 6 to 10, is an 18-wheel rake which includes booms 23, 24 having main boom sections 23A, 24A and hinged boom sections 23B, 24B as for V-rake 110, however the booms 23, 24 are extended in length using a single-wheel rake boom extension 31, 32.

The V-rake 10, 110, 210 would normally be supported by free wheeling wheels. As shown in FIGS. 3 and 9, the rear wheel assemblies 21, 22 may be fixed to the rear section 13 to support the back of the V-rake 10, 110, 210. In addition, the rake booms 23, 24 are further extended by castor extensions 33, 34, on which are mounted castor wheels 35, 36. The castor extensions 33,34 project towards the front and inside of the V-rake 10, 110, 210 so that the castor wheels 35, 36 are positioned in front of the rake wheels 25, 26 to provide stability to the rake booms 23, 24. In V-rakes 10, 110, which are quite long, it is preferable to have a further set of castor wheels 37, 38 mounted on the rake booms 23, 24 using brackets 39, 40. With the addition of rake extensions 31, 32 as in the V-rake 210 illustrated in FIG. 6, a further set of castor wheels 37, 38 may be mounted on the hinged boom sections 23B, 24B in addition to the to the castor wheels 37, 38 on the main boom sections 23A, 24A.

Figure 11:
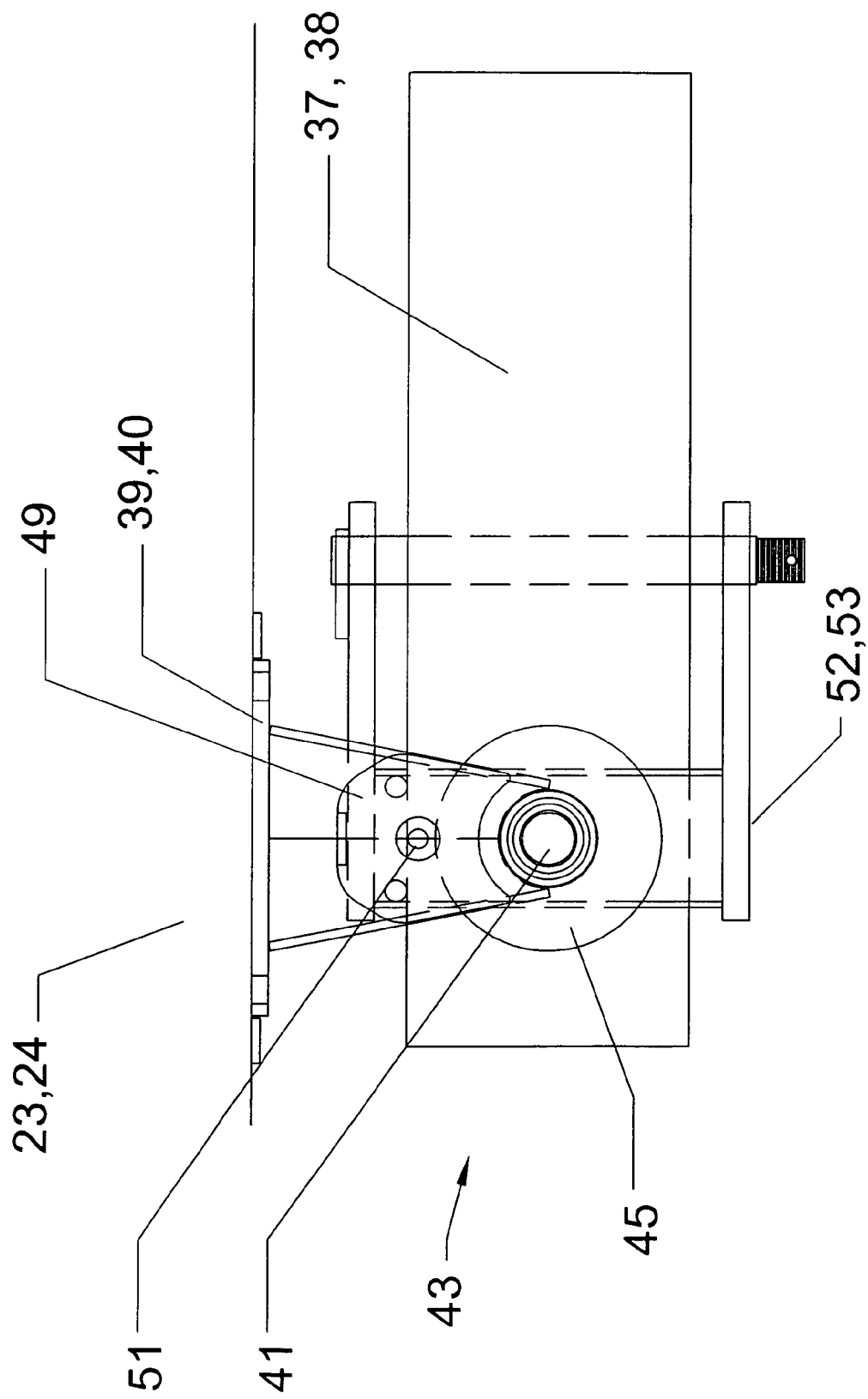
FIG. 11 illustrates a V-rake castor in top view.
Figure 12:
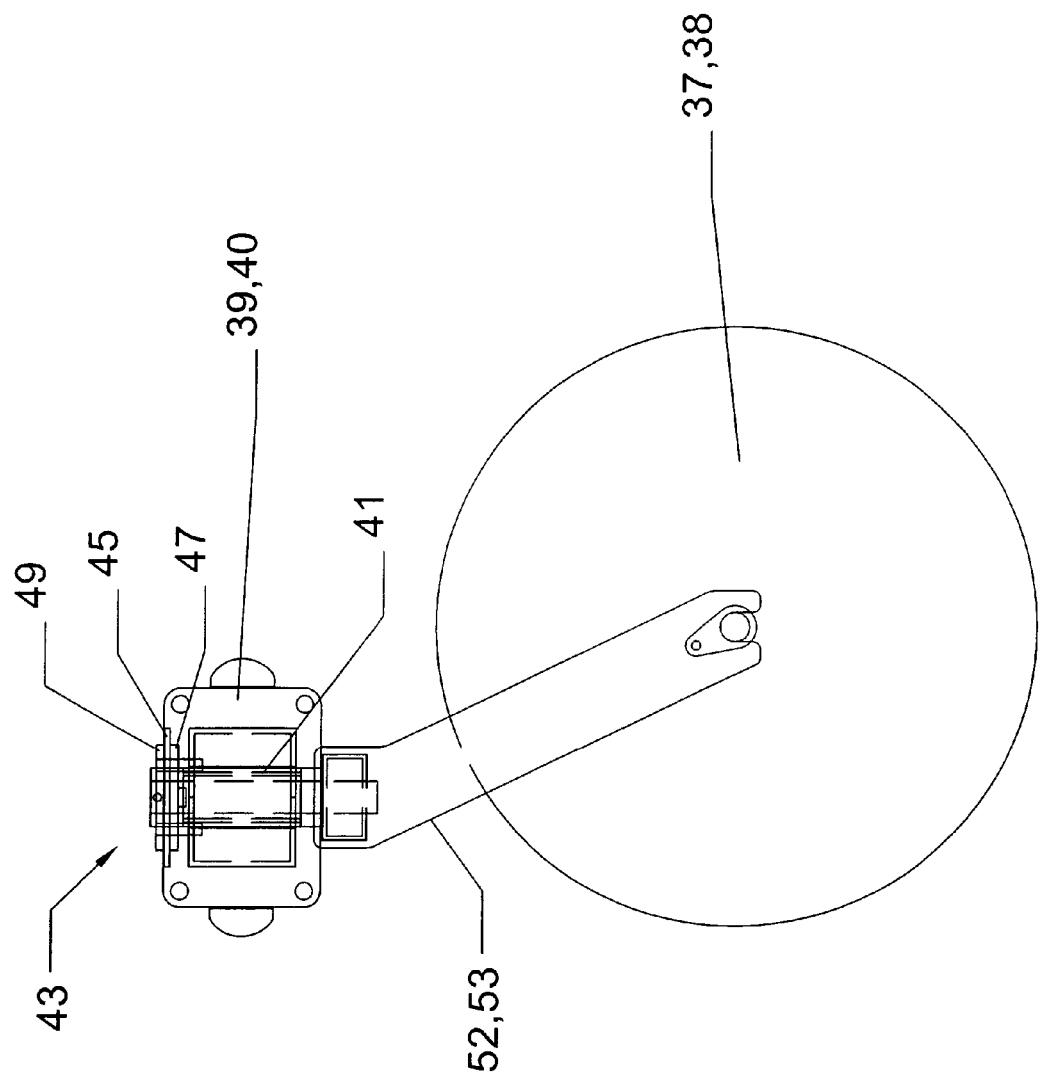
FIG. 12 illustrates the V-rake castor of FIG. 11 in side view.

The castors 37, 38 illustrated in FIGS. 11 and 12, may be mounted via a spindle 41 to the castor brackets 39, 40 which are fixed to rake booms 23, 24, and/or to the the hinged boom sections 23B, 24B of the rake booms 23, 24, using wheel mounts 52, 53. Further, castors 35, 36 may be mounted directly on the castor extensions 33, 34 via a spindle 41. However, it has been found that if the castors 35, 36, 37, 38 are left to rotate freely about the spindle 41 axis, they become unstable when the V-rake 10, 110, 210 is moving at high speeds while being relocated. A braking mechanism 43 is therefore fixed to the spindle 41. The braking mechanism 43 includes a brake disk 45, which rotates with the spindle 41, and lower and upper plates 47, 49 positioned so as to rub against the disk 45 between them. The pressure of the plates 47, 49 on the disk 45 is adjusted by a tightening screw 51, which passes through the plates 47, 49 into the castor extensions 33, 34 (not shown) or the brackets 39, 40.

As shown in FIGS. 1 to 10, in order to control the position of the booms 23, 24 with respect to the tow beam 12, a control mechanism 61 is connected to the booms 23, 24 and slidably connected to the main beam section 14. The control mechanism 61 includes riser arms 63, 64 fixed to the booms 23, 24 and shaped to slant upwardly and inwardly towards the center of the V-rake 10, 110, 210. Using ball joints, pairs of scissor arms 65, 67 and 66, 68 are connected at one end to shafts 69, 70, which pass through riser arms 63, 64. The other ends of scissor arms 65, 66 are connected using ball joints to a sleeve 71 that slides on the main beam section 14, while the other ends of scissor arms 67, 68 are connected using ball joints to a sleeve 72 that also slides on the main beam section 14. A hydraulic cylinder 73, which is fixed between sleeve 71 and the main beam section 14, operates to move the sleeve 71 towards the back of the V-rake 10, 110, 210 to close the rake placing it in its transport position, or to move the sleeve 71 towards the front of the V-rake 10, 110, 210 to place the rake in its operating position. As sleeve 71 is moved back or forth, the sleeve 72 is also forced to move forth or back as well. Alternately, the cylinder may be connected between sleeve 72 and the main beam section 14.

A number of rake wheels 25, 26 are mounted on the inside of the rake booms 23, 24 and their extensions 31, 32 using wheel arms 27, 28 which are pivotally connected to the rake booms 23, 24 and their extensions 31, 32 and controlled in height by springs assemblies 81, 82 in conjunction with wheel lift rods 83, 84. Conventional rake wheels 25, 26 may be used with the present V-rake 10. Alternately rake wheels 25, 26 in accordance with the present invention, which are described in conjunction with FIGS. 25 to 29, may also be used.

Figure 13:
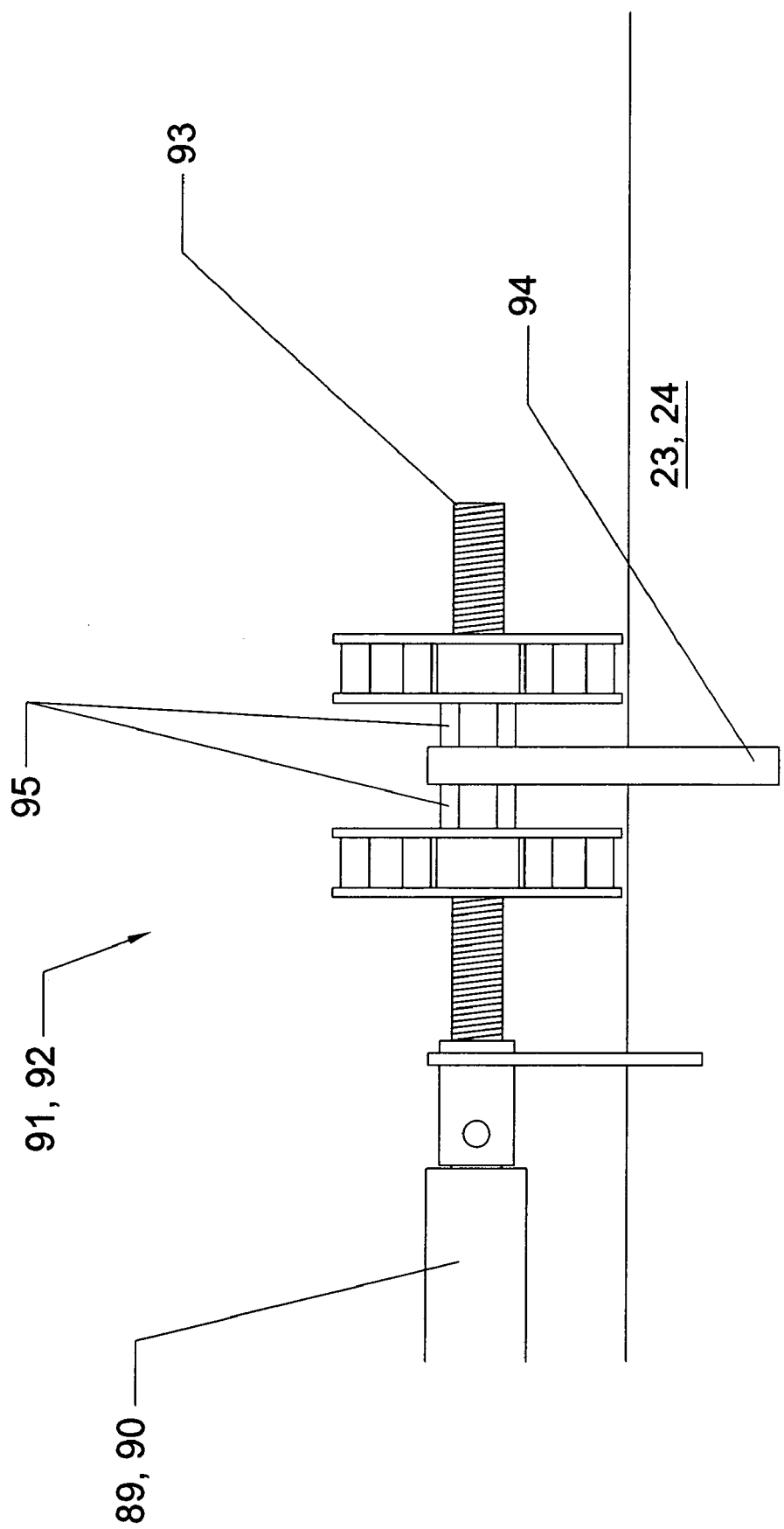
FIG. 13 illustrates the mechanical adjustment mechanism for a wheel lift rod.

The spring assemblies 81, 82 are connected to wheel lift rods 83, 84 by clips 85, 86 and the rods 83, 84 are mounted on the booms 23, 24 and extensions 31, 32 using plastic grommets 87, 88 so that the rods 83, 84 may be moved linearly along the booms 23, 24 and extensions 31, 32 using wheel lift hydraulic cylinders 89, 90. A mechanical adjustment mechanism 91, 92, as shown in FIG. 13, may also be connected between the wheel lift hydraulic cylinders 89, 90 and the booms 23, 24 to assure the ideal operating weight of the wheels 25, 26 with respect to the terrain surface. The adjustment mechanism 91, 92 may consist of a threaded rod 93 passing through a bracket 94 fixed to the boom 23, 24 with a nut 95 on the rod 93 on either side of the bracket 94. Using the nuts 95, the rod 93 may be adjusted longitudinally along the length of the boom 23, 24.

When the rake booms 23, 24 include hinged boom sections 23B, 24B that are connected to the main boom sections 23A, 24A using knuckle hinges 100, it is necessary to include two pivot points in both of the wheel lift rods 83, 84. One of the pivot points would be located in the rods 83, 84 at a point just above the knuckle 100 axis when the rake wheels 25, 26 are lowered in their operating position and the other of the pivot points would be located in the rods 83, 84 at a point just above the knuckle 100 axis when the rake wheels 25, 26 are raised for their transport position.

Figure 14:
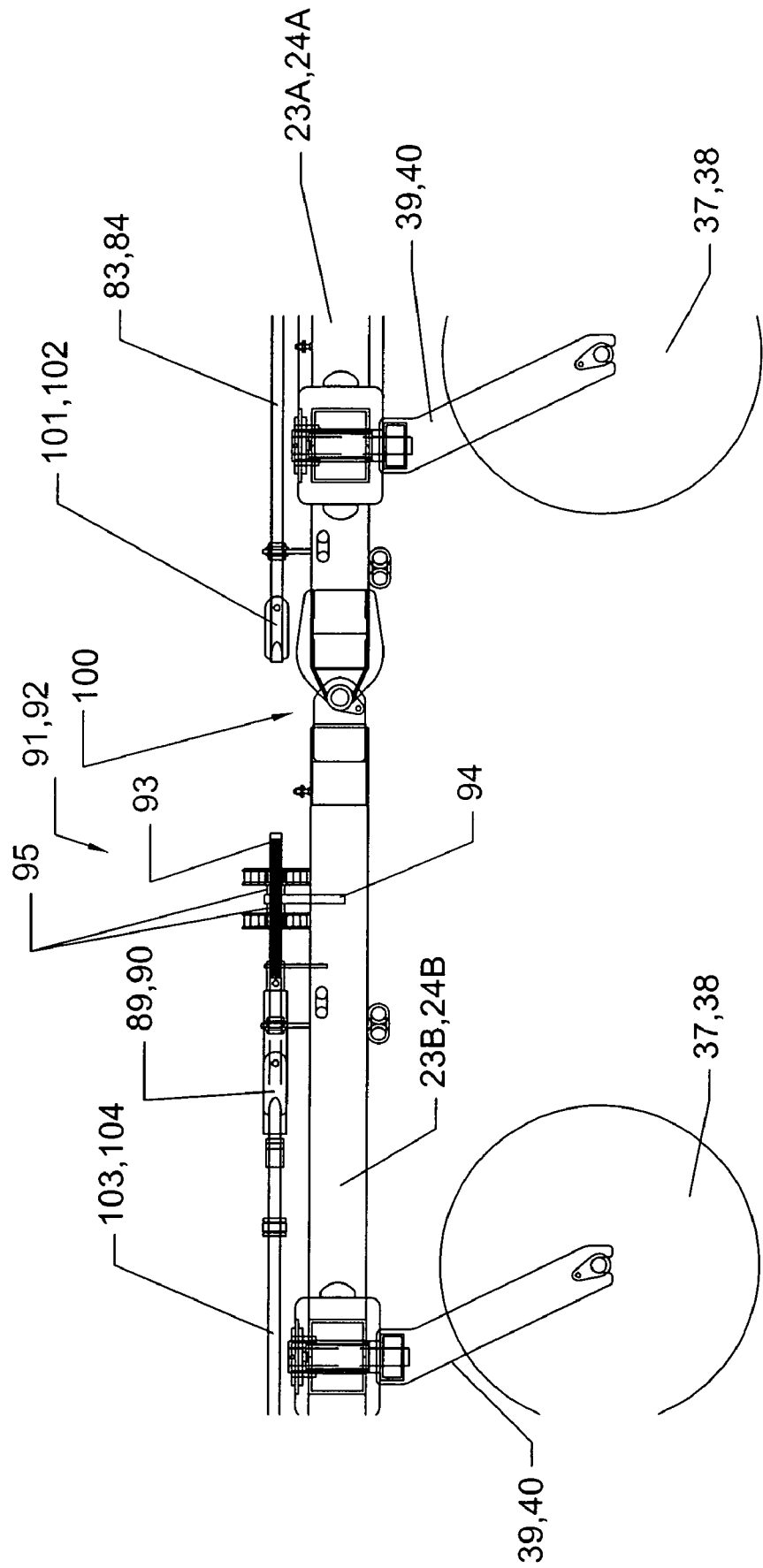
FIG. 14 illustrates in side view a connection between a rake boom and a rake boom extension.
Figure 15:
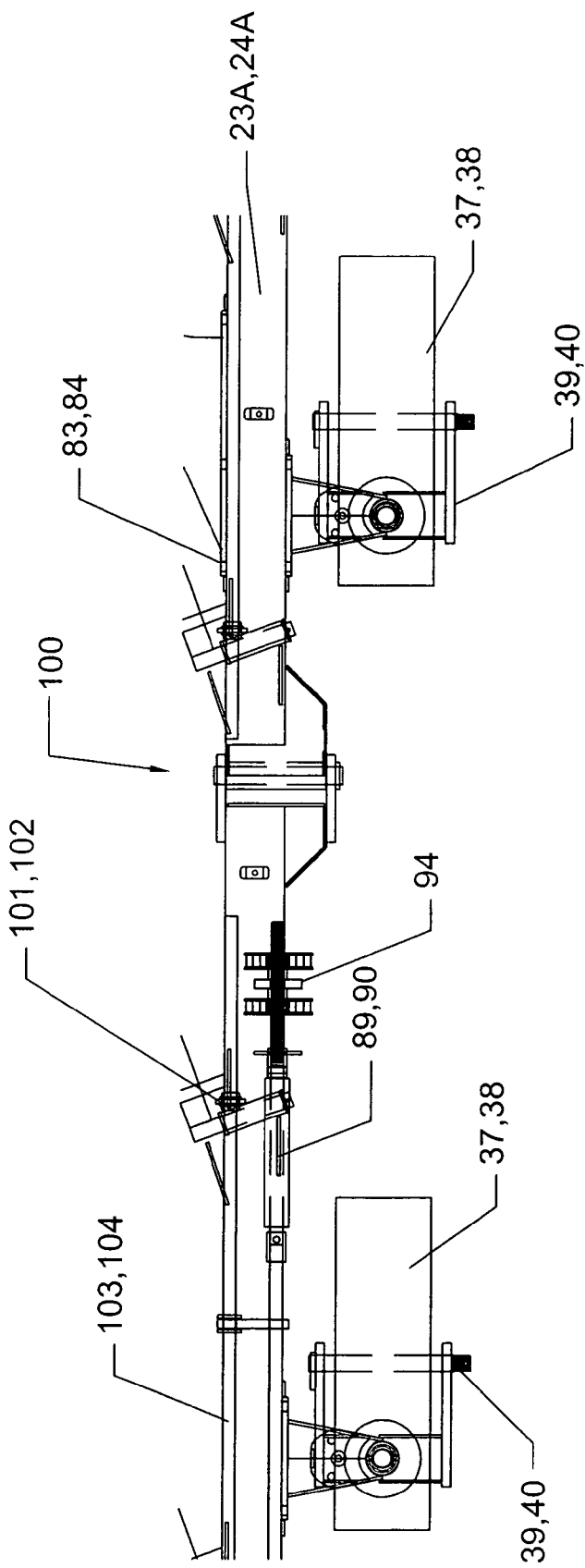
FIG. 15 illustrates in top view the connection between a rake boom and a rake boom extension of FIG. 14.

Alternately, as shown in FIGS. 14 and 15, the wheel lift rods 83, 84 may be slidably terminated in a bracket 101, 102 at the front end of the rake boom sections 23A, 24A at the knuckle hinge 100. Additional wheel lift rods 103, 104 may be used to control the rake wheels 25, 26 that are connected to the hinged boom sections 23B, 24B and the boom extensions 31, 32. The positioning of rods 103, 104 will be controlled by a similar mechanism as rods 83, 84. Wheel lift hydraulic cylinders 89, 90 are connected between rods 103, 104 and a mechanical adjustment mechanism 91, 92. The adjustment mechanism 91, 92 may consist of a threaded rod 93 passing through a bracket 94 fixed to the arm 23B, 24B with a nut 95 on the rod 93 on either side of the bracket 94. Using the nuts 95, the rod 93 may be adjusted longitudinally along the length of the arm 103, 104.

In view of the weight of the rake wheels 25, 26 used in wheel rakes 10, 110, 210, a spring assembly 81, 82 is required for each rake wheel 25, 26 to maintain a predetermined ideal wheel weight on the ground surface to prevent the rake wheel 25, 26 from digging into the ground. The spring assembly 81, 82 also has the function of assisting a wheel 25, 26 to rise over bumps or rocks on the ground surface, as well as to prevent a wheel 25, 26 from abruptly dropping into a depression in the ground surface. Further, the spring assemblies 81, 82 operate in conjunction with wheel lift rods 83, 84 to move the wheels 25, 26 between their operating and transport positions.

Figure 16:
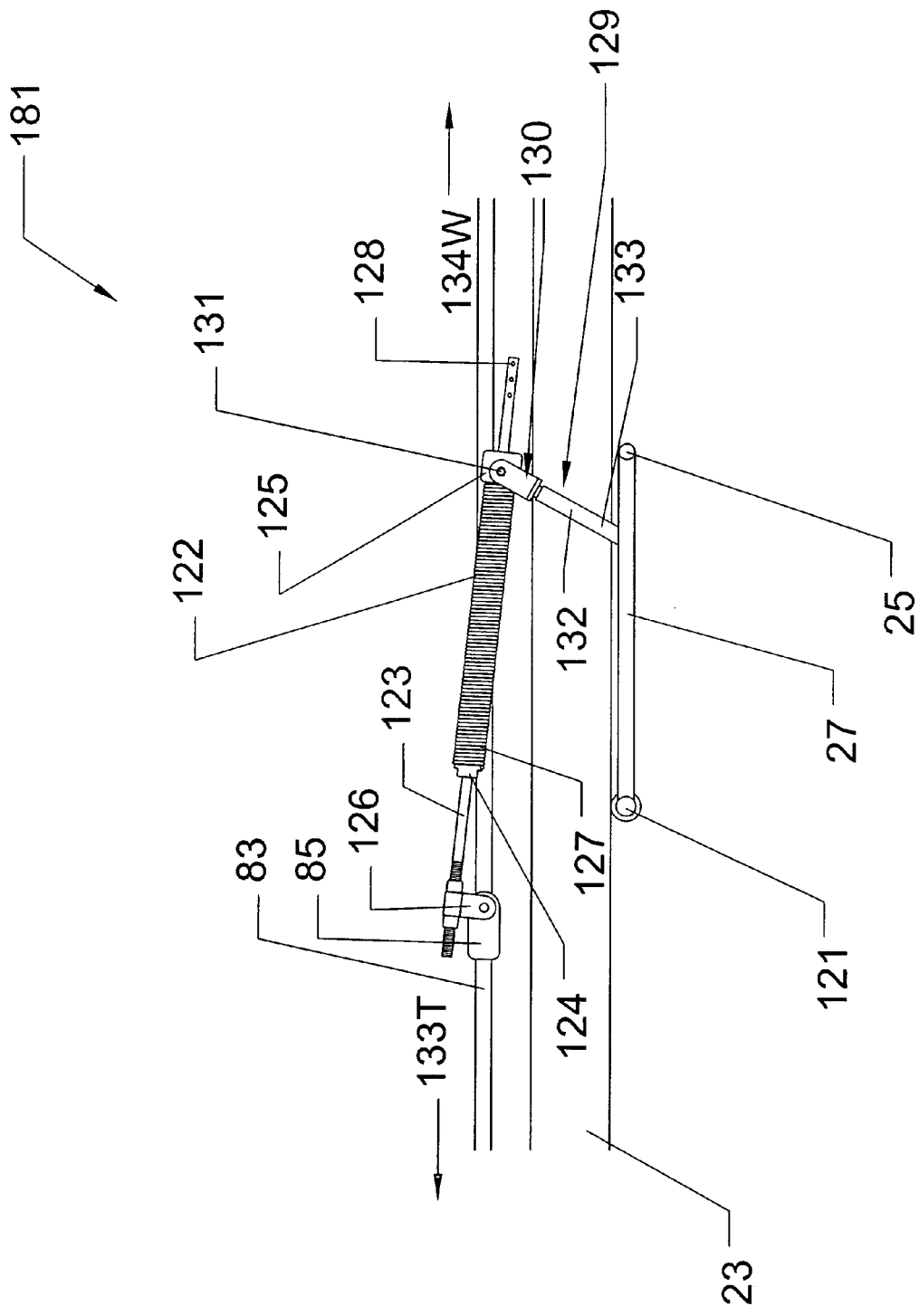
FIG. 16 illustrates in side view a tension spring assembly for rake wheels in accordance with the present invention.
Figure 17:
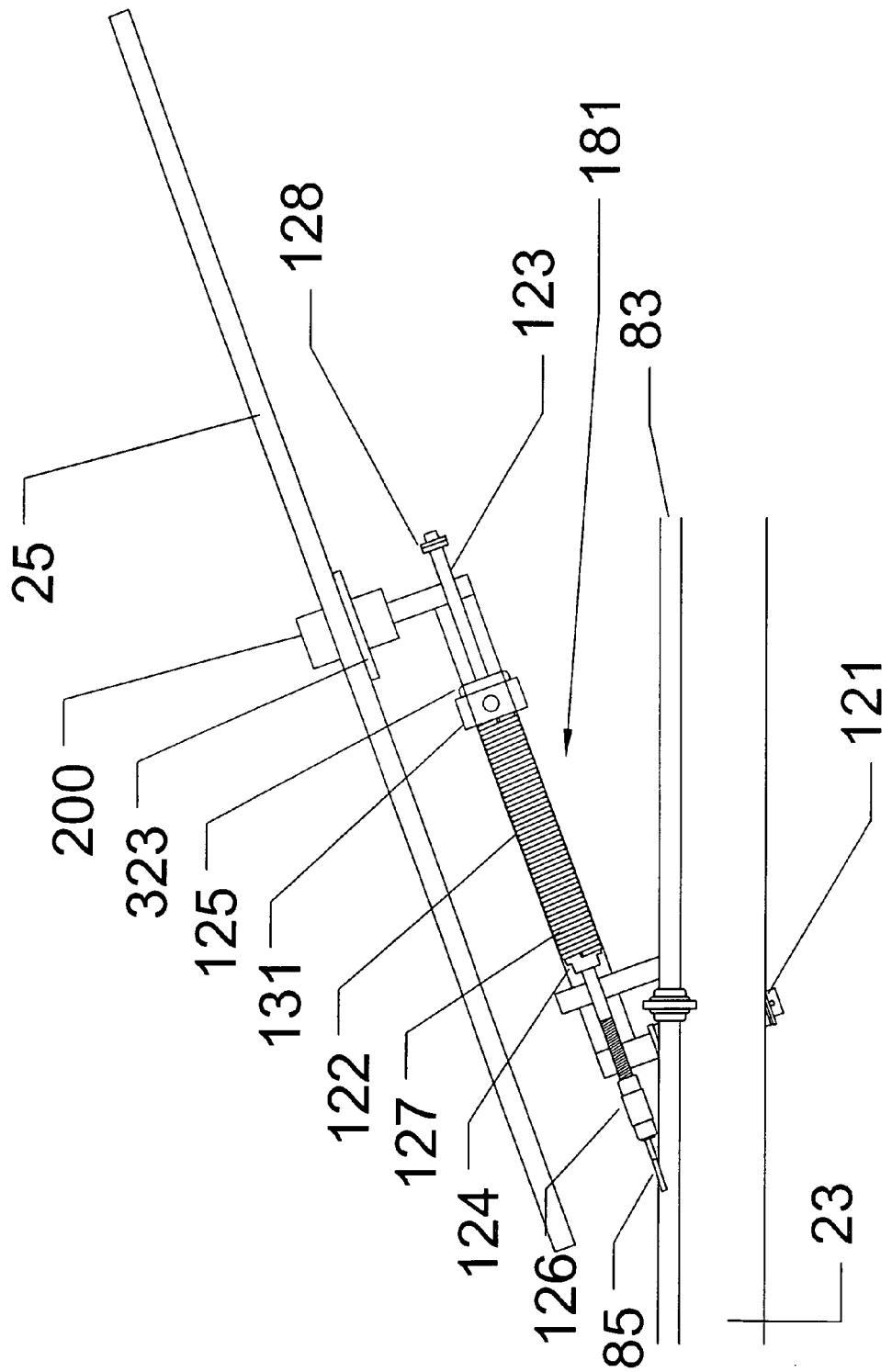
FIG. 17 illustrates in top view the tension spring assembly of FIG. 16.
Figure 18:
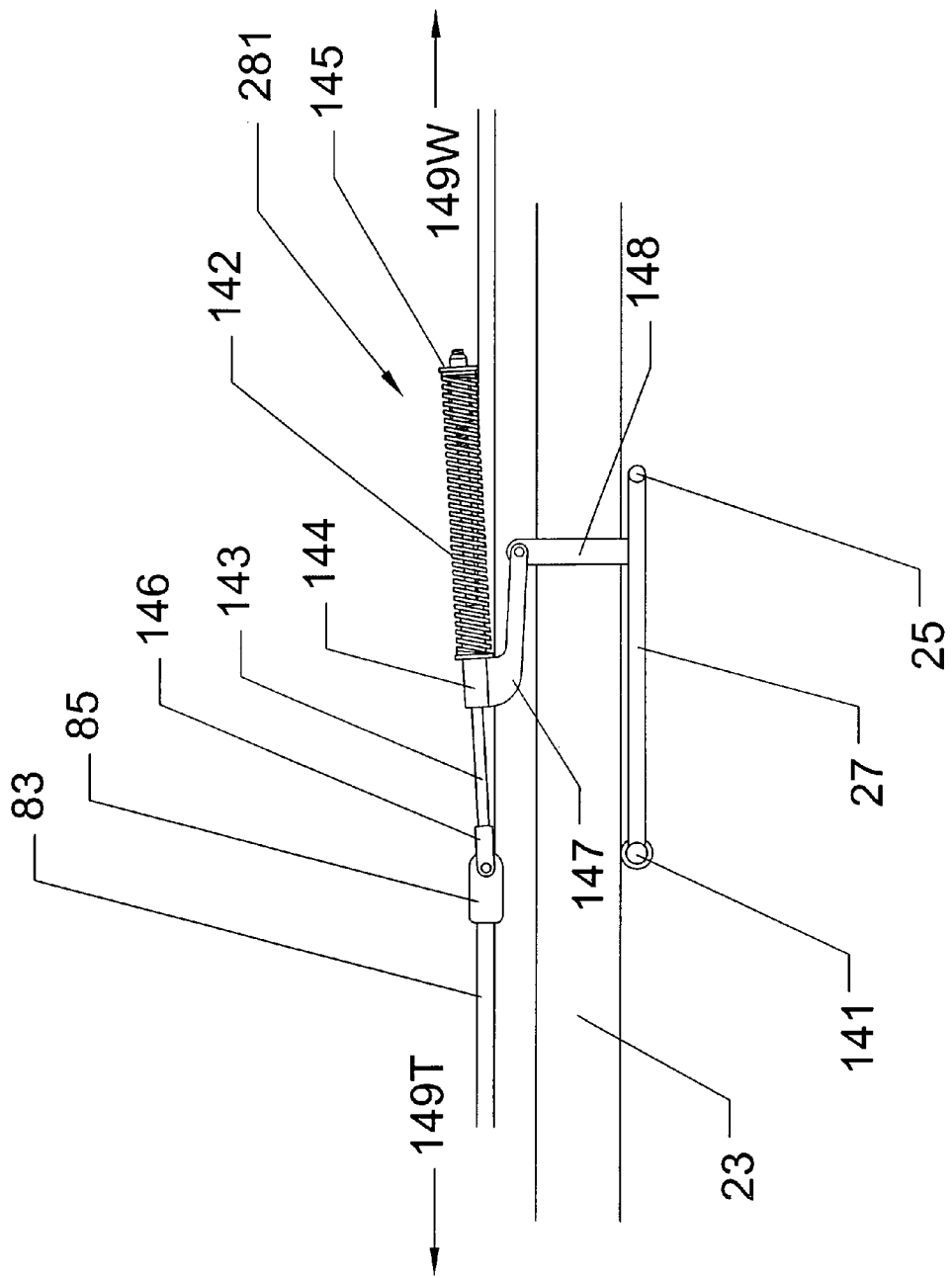
FIG. 18 illustrates in side view a compression spring assembly for rake wheels in accordance with the present invention.

Either the tension spring assembly 181 shown in FIGS. 16 and 17 or the compression spring assembly 281 shown in FIG. 18 may be used as the spring assembly 81 for the V-rakes 10, 110, 210 illustrated in FIGS. 1 to 10. Spring assembly 181, 281 is attached between the wheel arm 27 and the wheel lift rod 83, 103 on the left side of the V-rake 10, 110, 210. The spring assembly 182, 282 between the wheel arm 28 and wheel lift rod 84, 104 on the right side of the V-rake 10, 110, 210 is constructed similarly to, but as a mirror image of, the left side spring assembly 181, 281, and operates in a similar manner.

Making reference to FIGS. 16 and 17, the tension spring assembly 181 is mounted between the wheel arm 27, which is connected to the rake wheel 25 at one end and which pivots using a pin 121 that is attached to the rake boom 23, or an extension 31. The tension spring assembly 181 is further connected to the wheel lift rod 83, 103 using a clip 85. A tension spring 122 is mounted on a rod 123 using plastic inserts 124, 125, which screw into the ends of the spring 122, such that the rod 123 can move freely through the inserts 124, 125. One end of the rod 123 is threaded and is screwed into a yoke 126 that connects to the clip 85. This permits the height of each wheel 25 to be adjusted individually. A stopper 127 is fixed to the rod 123 a predetermined distance from the yoke 126 allowing the plastic insert 124 to slide on the rod 123 between the stopper 127 and the yoke 126. This will permit a wheel 25 to rise when it moves over a bump. The other end of the rod 123 extends out of the end of the spring 122 somewhat at the plastic insert 125. However, a stopper 128 is placed at the end of rod 123 such that the plastic insert 125 will not slide past the end of the rod 123. This is required so that there is a limit to the distance that a wheel 25 may drop as it passes over a depression. An arm 129, which is fixed in length, connects the wheel lift arm 27 to the plastic insert 125. The arm 129 preferably has a yoke or clevis 130, which is pivotally connected to the plastic insert 125 using pins 131. The base 132 of the clevis 130 is in the form of a shaft that is able to turn in a cylinder 133 and is fixed therein so that there will be no longitudinal movement. Cylinder 133 is fixed to the wheel lift arm 27.

In operation, the wheel 25 is lowered by moving the wheel lift rod 83, 103 in the direction of arrow 134W, placing the spring mechanism 181 in the working position shown in FIGS. 16 and 17, where just sufficient tension remains on the spring 122 to permit the wheel to be turned by the surface of the ground. In this position, if the wheel 25 moves over a bump, tension is released by the lifting wheel 25; if the wheel goes over a depression, tension is increased by the dropping wheel 25. To lift the wheel 25 to the transport position, the wheel lift rod 83 is moved in the direction of arrow 134T, placing more tension on the spring 122 to lift the wheel 25.

Making reference to FIG. 18, the compression spring assembly 281 is mounted between the wheel arm 27, which is connected to the rake wheel 25 at one end and which pivots using a pin 141 that is attached to the rake boom 23 or an extension 31. The compression spring assembly 281 is further connected to the wheel lift rod 83, 103 using a clip 85. A compression spring 142 is mounted on a rod 143 using an insert 144 having a plastic lining at one end and a fixed plug 145 at the other end. Insert 144 is designed to permit it to slide freely on the rod 143. One end of the rod 143 is fixed to a yoke 146 that connects to the clip 85. The insert 144 has an arm 147 extending from one side and curved through an angle of approximately 70 degrees. It is pivotally connected to an arm 148 that is perpendicular and fixed the wheel arm 27.

In operation, the wheel 25 is lowered by moving the wheel lift rod 83 in the direction of arrow 149W, placing the spring mechanism 281 in the working position shown in FIG. 18, where just sufficient compression remains on the spring 142 to permit the wheel to be turned by the surface of the ground. In this position, if the wheel 25 moves over a bump, compression is released by the lifting wheel 25; if the wheel goes over a depression, compression is increased by the dropping wheel 25. To lift the wheel 25 to the transport position, the wheel lift rod 73 is moved in the direction of arrow 149T, placing more compression on the spring 142 to lift the wheel 25.

Figure 19:
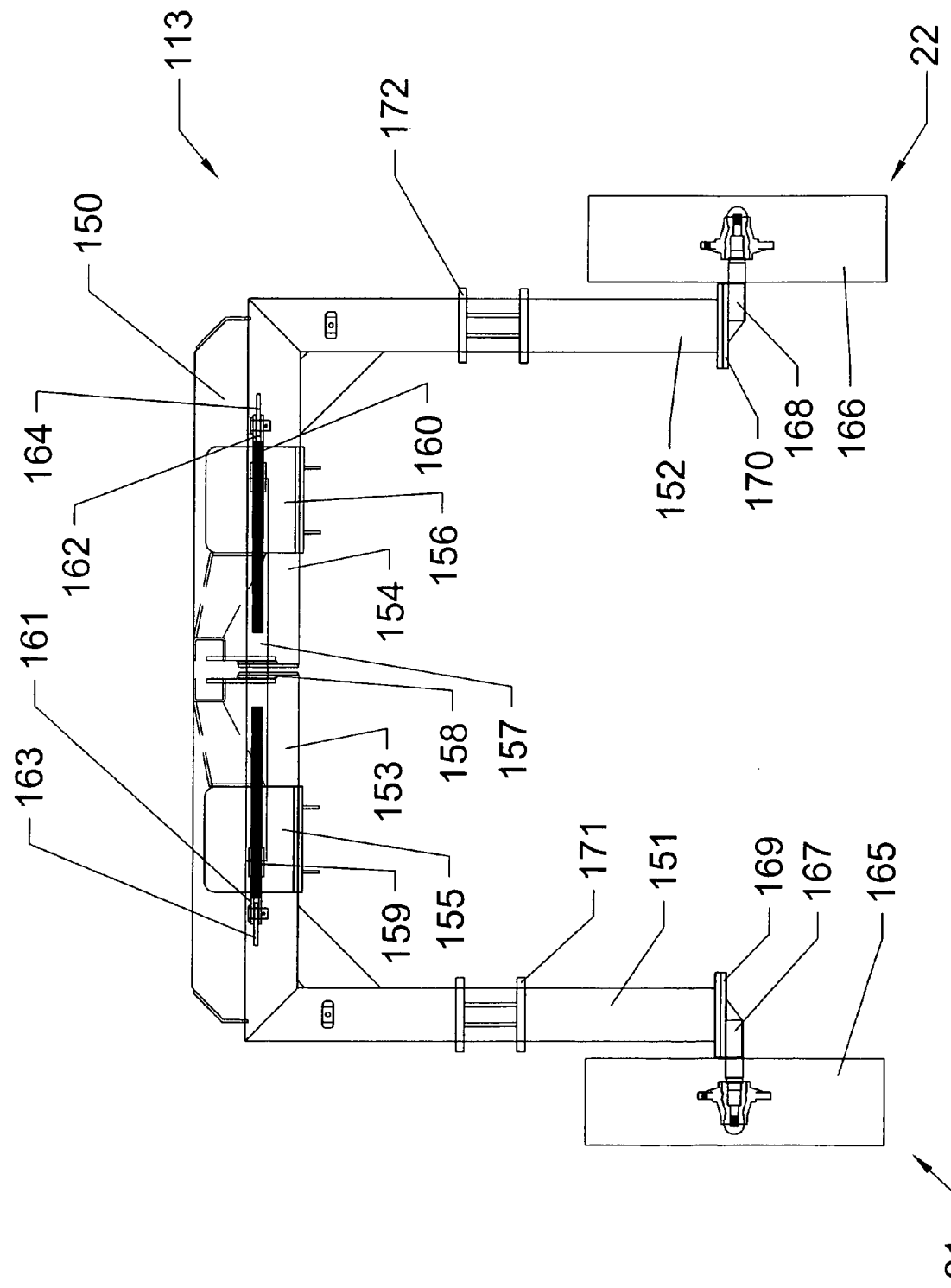
FIG. 19 illustrates one embodiment of a back section for a V-rake in accordance with the present invention.
Figure 20:
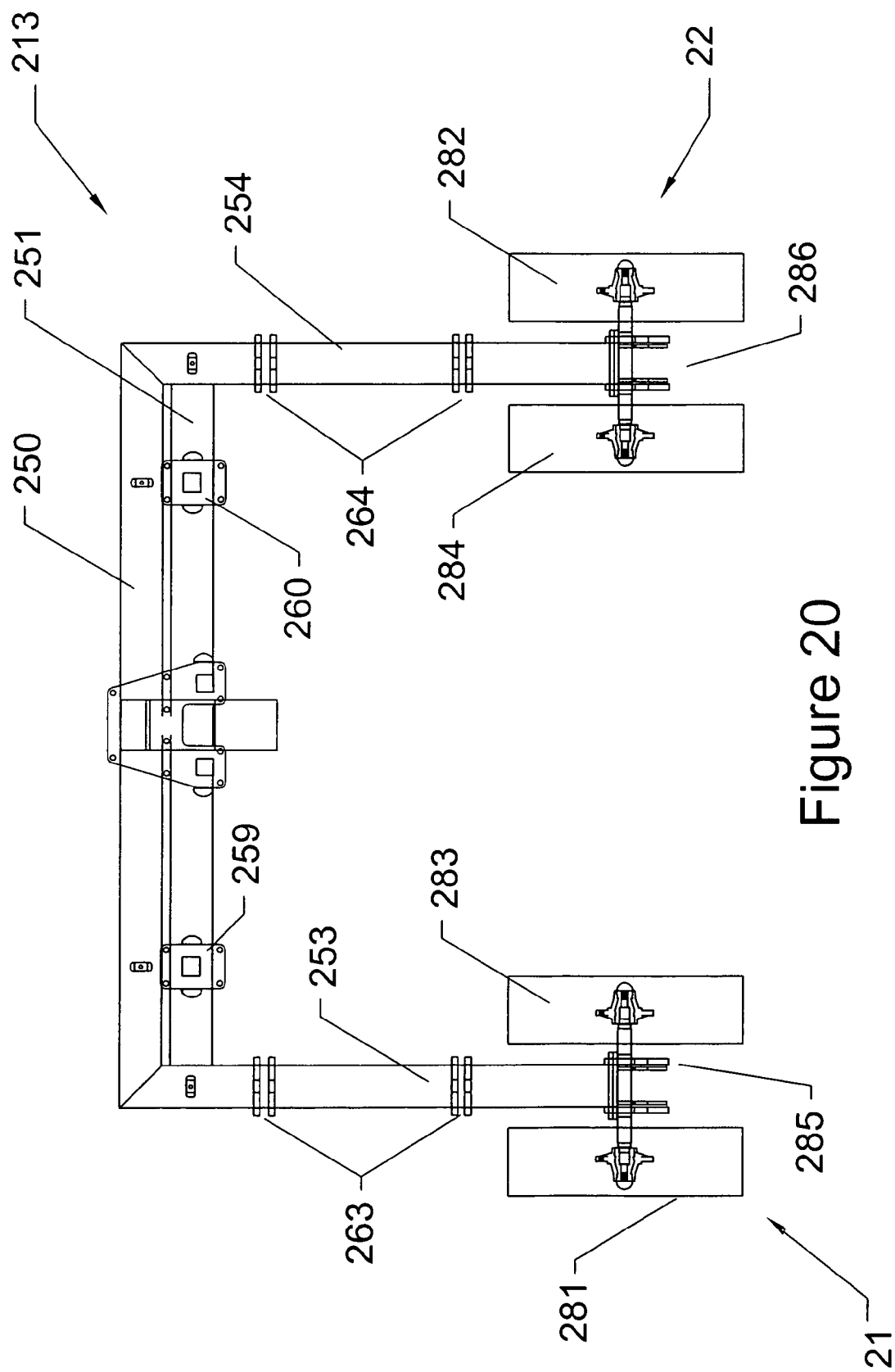
FIG. 20 illustrates another embodiment of a back section for a V-rake in accordance with the present invention as seen from the back of the V-rake.
Figure 21:
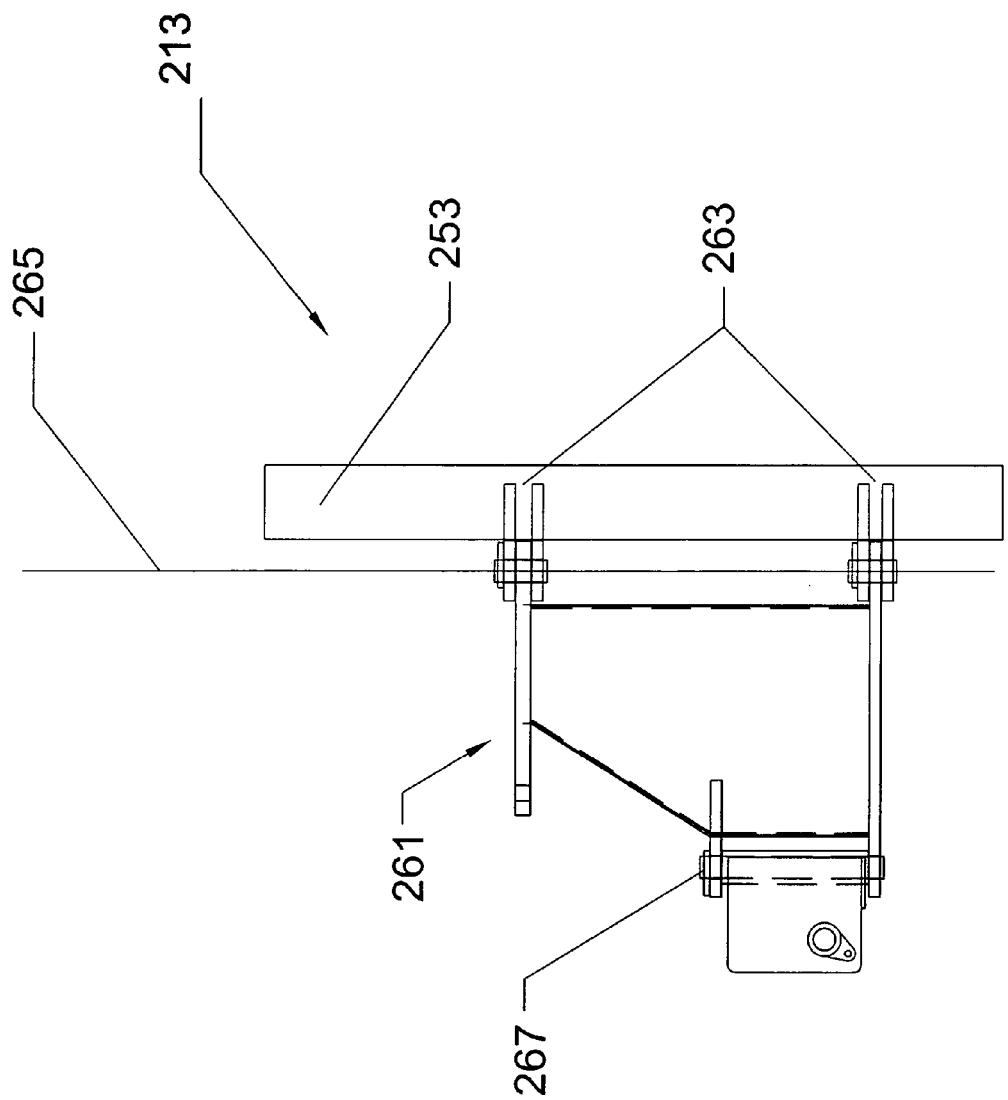
FIG. 21 illustrates a pivot box for the back section of FIG. 20.
Figure 22:
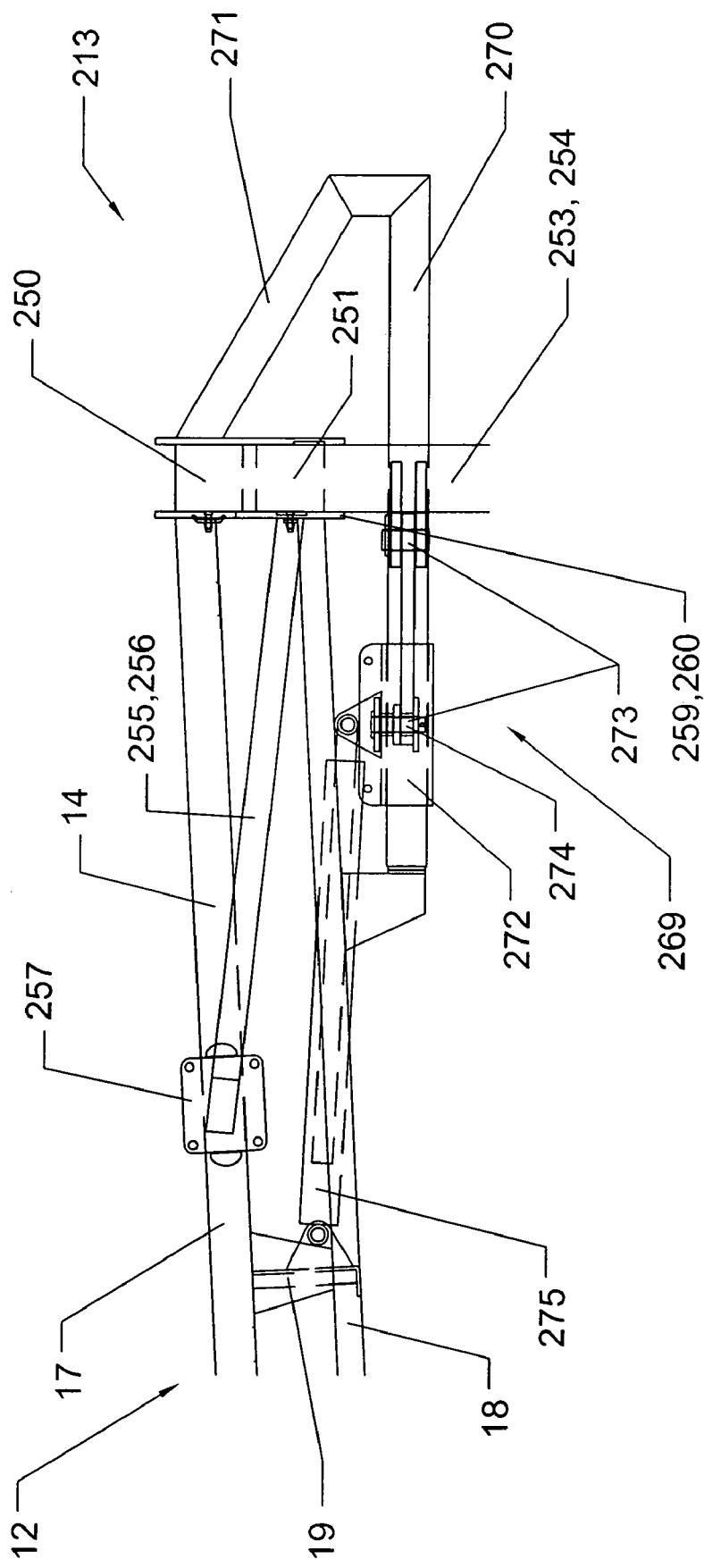
FIG. 22 illustrates in side view a windrow width control mechanism.

In the V-rake 10, 110, 210, the cut agricultural material in a field is raked towards the center of the rake to form a windrow. As it is desirable to have windrows of different widths depending on factors such as the type of equipment that will be gathering the material and/or the yield of the material to be gathered, the V-rake 10, 110, 210, in accordance with the present invention, has a back section 13 adapted to adjust the distance between the rake wheel assemblies 21, 22 at the back of the V-rake 10, 110, 210. FIG. 19 illustrates a mechanically adjusted back section 113 while FIGS. 20 to 22 illustrate a hydraulically adjusted back section 213. Though any one of these back sections 113, 213 can be used with any one of the V-rakes 10, 110, 210, V-rake 10 is illustrated in FIGS. 1 to 3 with a back section 113 and V-rakes 110 and 210 are illustrated in FIGS. 4 to 10 with a back section 213.

The back section 113, as shown in detail in FIG. 19, includes a first horizontal beam 150 that is fixed at the center of the beam 150 to the tow beam 12. The back section 113 further includes two vertical beams 151 and 152, each fixed to second horizontal beams 153, 154, which abut at the center of the rear section 113. U-shaped channels 155, 156 which are fixed to the first horizontal beam 150, hold the second horizontal beams 153, 154 in close proximity to the first horizontal beam 150, yet permitting the second horizontal beams 153, 154 to extend outward from the center. The back section 113 further includes oppositely threaded rods 159, 160 with ends fixed to devises 161, 162 that connect to brackets 163, 164. Brackets 163, 164 are fixed to the second horizontal beams 153, 154. A pipe 157 having inner opposite threads is screwed onto the rods 159, 160. A ratchet 158 is used to rotate the pipe 157, thereby moving the rods 159, 160 into or out of the pipe 157 resulting in the vertical sections 151, 152 being moved inward or outward from the center of the V-rake 10 to adjust the width of the windrow formed by the V-rake 10.

Wheel assemblies 21, 22 each include single wheels 165 and 166 mounted on spindles 167, 168. The spindles 167, 168 are welded to flanges 169, 170 that are fixed to the ends of the vertical beams 151, 152.

Brackets 171, 172 are located approximately midway up the vertical beams 151, 152 so that the rake booms 23, 24 may be connected to the back section 113 using 4-way knuckle joints 173, 174. The knuckle joints 173, 174 permit the booms 23, 24 to pivot in the horizontal direction so that the V-rake 10 may be opened and closed, as well as to pivot in the vertical direction to permit the booms 23, 24 to follow the contour of the terrain without placing undue stress on the connection between the booms 23, 24 and the back section 113.

The back section 213 illustrated in FIG. 20 to 23 is basically a U-frame comprising first and second horizontal beams 250, 251 with their ends fixed to two vertical beams 253, 254. As shown in FIGS. 22, the main beam section 14 of tow beam 12 is fixed to the back section 213, with the beam 17 being connected to the first horizontal beam 250 and the truss support 18 being connected to the second horizontal beam 251, which is vertically spaced from the first horizontal beam 250. Further a pair of braces 255, 256 are connected between the beam 17 by an adjustable bracket 257 and the second horizontal beam 251 at fixed brackets 259, 260.

Figure 23:
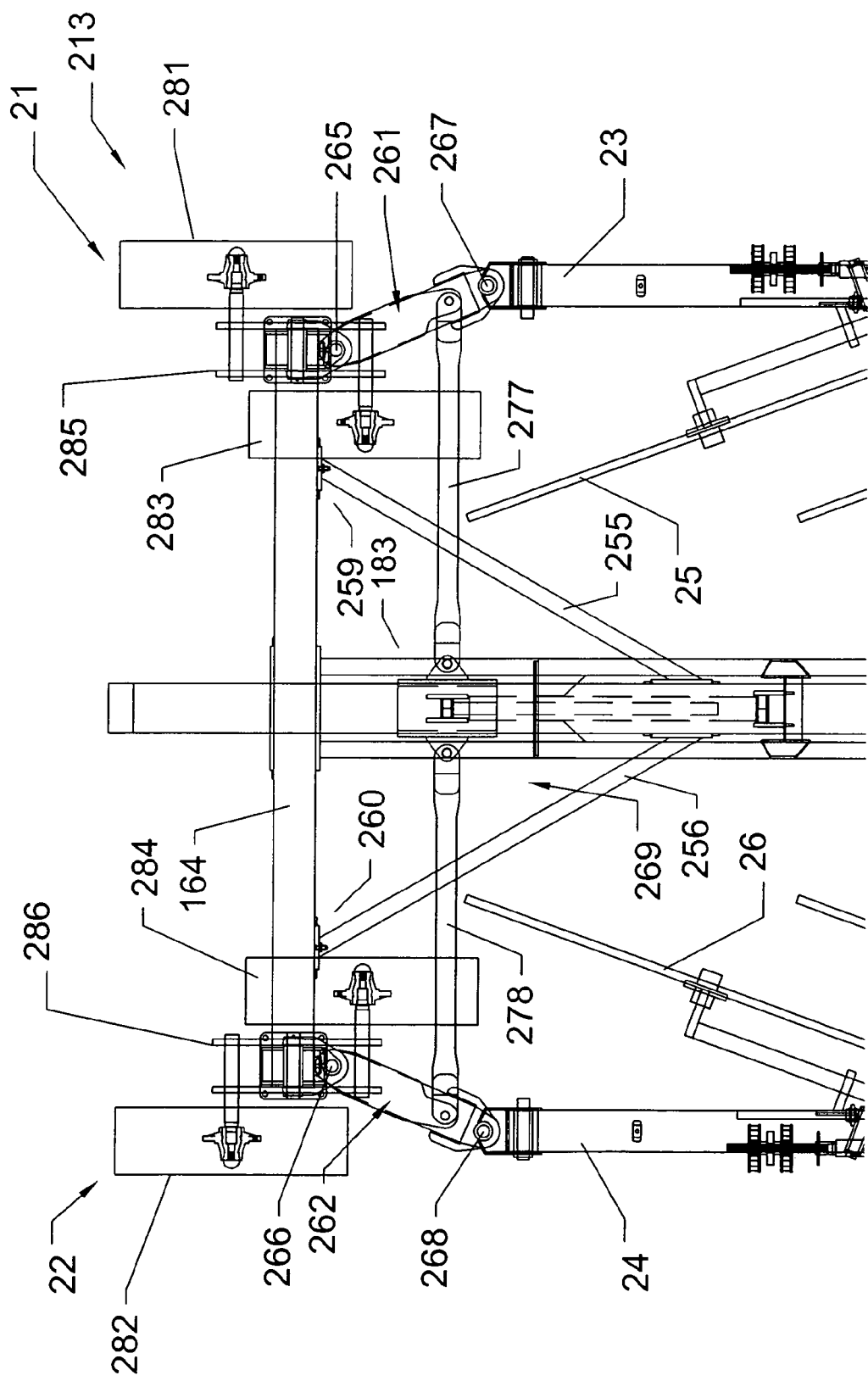
FIG. 23 illustrates in top view the windrow width control mechanism of FIG. 22.

The rake booms 23, 24 are attached to the vertical beams 253, 254 using pivot boxes 261, 262 of the type shown in FIG. 21. The pivot boxes 261, 262 are attached to the vertical beams by brackets 263, 264 where they are permitted to pivot about vertical axes 265, 266. The rake booms 23, 24 are connected to the other end of the pivot boxes 261, 262 by pins 267, 268 such that they are able to pivot about the axis of pins 267, 268 relative to the pivot boxes 261, 262. As can be seen in FIG. 23, the booms 23, 24 may pivot into an open or closed position about pins 267, 268, and in addition, the pivot boxes 261, 262 may be pivoted about axes 265, 266 to move the back ends of the rake booms 23, 24 either closer together or further apart, without changing the relative positions of the rake wheel assemblies 21, 22. The rake wheel assemblies 21, 22 follow in the same track all of the time.

In the present embodiment, the positioning of the pivot boxes 261, 262 is hydraulically controlled. The structure 269 for implementing the control function is best shown in FIGS. 22 and 23. Structure 269 includes a horizontal beam 270, which is held at the center of the back section 213 below horizontal beam 251 and in between vertical beams 253, 254, by an arm 271, which is fixed to the horizontal beam 25.0. A sleeve 272 is mounted on the horizontal beam 270 such that it is free to slide along the beam 270. The beam 270 may include a clevis 273 for receiving a pin 274 in the sleeve 272, which would limit the distance of travel of the sleeve 272. Further, a hydraulic cylinder 275 has one end pivotally connected to the sleeve 272 and the other end connected to a truss plate 19, in order to control the movement of the sleeve 272. To control the position of the rake booms 23, 24, linkages 277, 278 are pivotally connected between the sleeve 272 and the pivot boxes 261, 262 respectively.

In operation, when the sleeve 272 is in its forward position, the position shown in FIG. 23, the back ends of the booms 23, 24 are the furthest apart, which would result in a wide windrow. Alternately, when the sleeve 272 is in its furthest rearward position, linkages 277, 278 bring the ends of booms 23, 24 closer together, which would result in a narrow windrow. It is noted that the windrow width can therefore be adjusted without changing the distance between the back wheel assemblies 21, 22. Also, the hydraulic cylinder 275 may be controlled to obtain a windrow width anywhere in between the extremes of a narrow and a wide windrow.

FIGS. 4 and 6 illustrate examples of V-rakes 110, 210 in their operating position with the booms 23, 24 positioned to provide the widest possible windrow, while FIGS. 5 and 7 illustrate examples of V-rakes 110, 210 in their operating position with the booms 23, 24 positioned to provide the narrowest possible windrow. It is to be noted that, since fixed riser arms 63, 64 represent pivot points at shafts 69, 70 for rake booms 23, 24, the opening or the distance between the ends of booms 23, 24 at the front of an open V-rake 110, 210, is greater when the back ends of booms 23, 24 are closer together, then when the back ends of booms 23, 24 are further apart. In other words, the swath covered by a V-rake 110, 210 that is producing narrow windrows is greater then the swath covered by a V-rake 110, 210 that is producing a wide windrow.

In addition, as shown in FIG. 8 for the transport position, the back ends of booms 23, 24, which are as apart from one another that they can be, are still within the wheels assemblies 21, 22. Therefore, the wheel assemblies 21, 22 dictate the overall width of the V-rake 10, 110, 210 in transport position. It is further noted that the booms 23, 24 may be brought closer together, both at the back and the front of the V-rake 10, 110, 210. In order to stabilize the V-rake 10,110, 210 further while in transport, a pair of transport arms 105, 106 may be pinned between the tow beam gooseneck section 15 and the castor extensions 33, 34.

Figure 24:
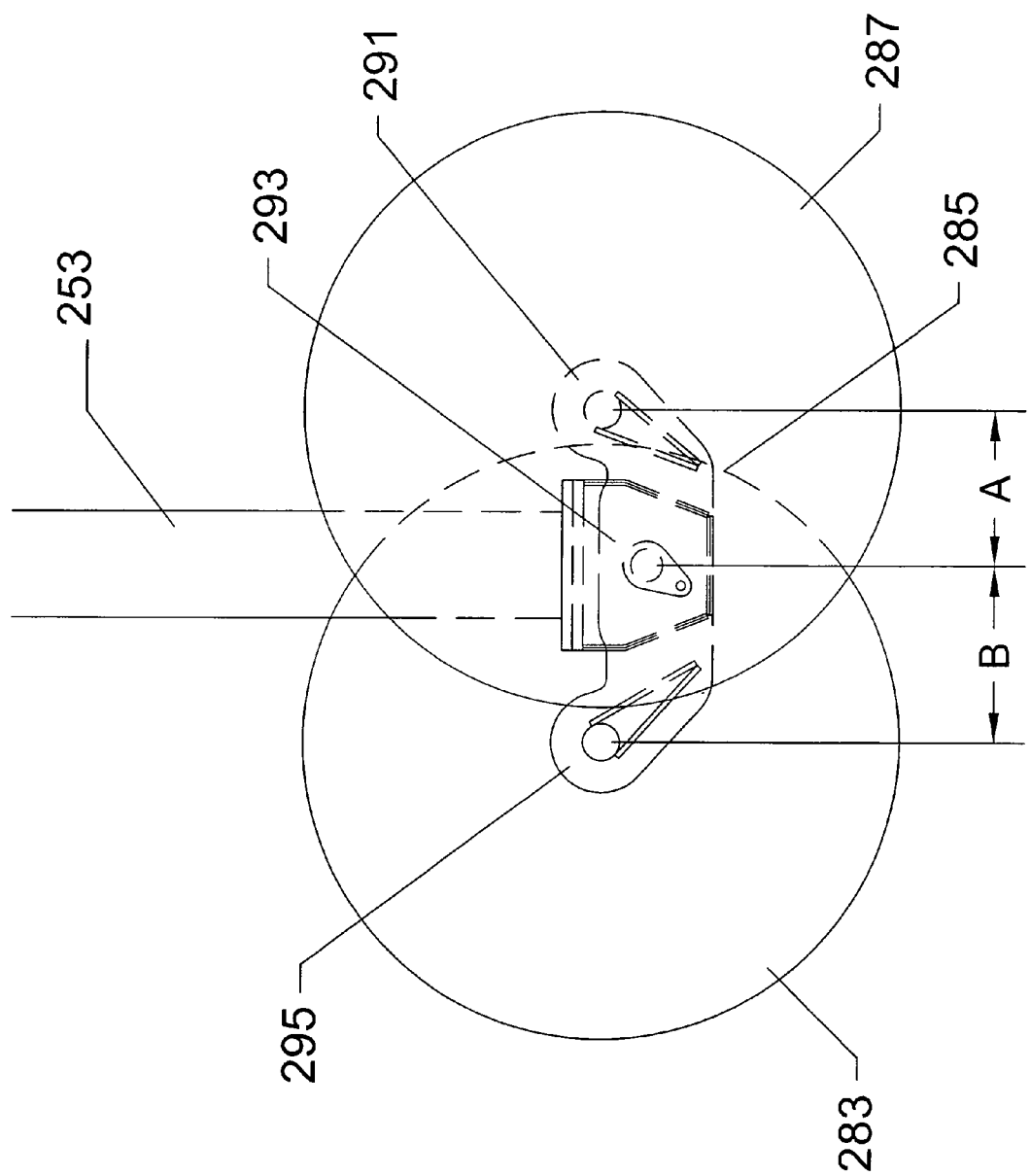
FIG. 24 illustrates a tandem wheel assembly for the V-rake.

As shown in FIG. 20, the back wheel assemblies 21, 22 are fixed to the lower ends of vertical beams 253, 254. However, as shown in FIGS. 20, 23 and 24, rather then having single wheels, each assembly 21, 22 includes a pair of tandem wheels 281, 283 and 282, 284; wheels 281, 282 being the outer wheels and wheels 283, 284 being the inner wheels. In addition, the wheels 281, 283 and 282, 284, are mounted on a carriage 285, 286 which is pivotally connected to the ends of vertical beam 253, 254. The carriage 285, 286 is constructed such that the outer wheels 281, 282 are positioned towards the back of the back section 213, whereas the inner wheels 283, 284 are positioned towards the front of the back section 213. This arrangement has the advantage that wheels 283, 284 are located close to, but behind the back rake wheels 25, 26 whether the V-rake 110, 210 is positioned to produce wide windrows as shown in FIG. 23, or narrow windrows. This arrangement prevents the wheels 283, 284 from running over material in the windrow as it settles with the passing of the last rake wheels 25, 26. Since, the back wheels 281, 282 are further apart, they also will not run over the settled windrow.

Further, as shown in FIG. 24, the distance "A" between back wheel 281, 282 spindle mount 291 and the pivot mount 293 for the carriage 285, 286 is shorter than the distance "B" between front wheel 283, 285 spindle mount 295 and the pivot mount 293 for the carriage 285, 286. In this way, less ground pressure is applied to the front wheels 283, 284, which tend to float, preventing them from being pressed into the ground in rough fields.

Figure 25:
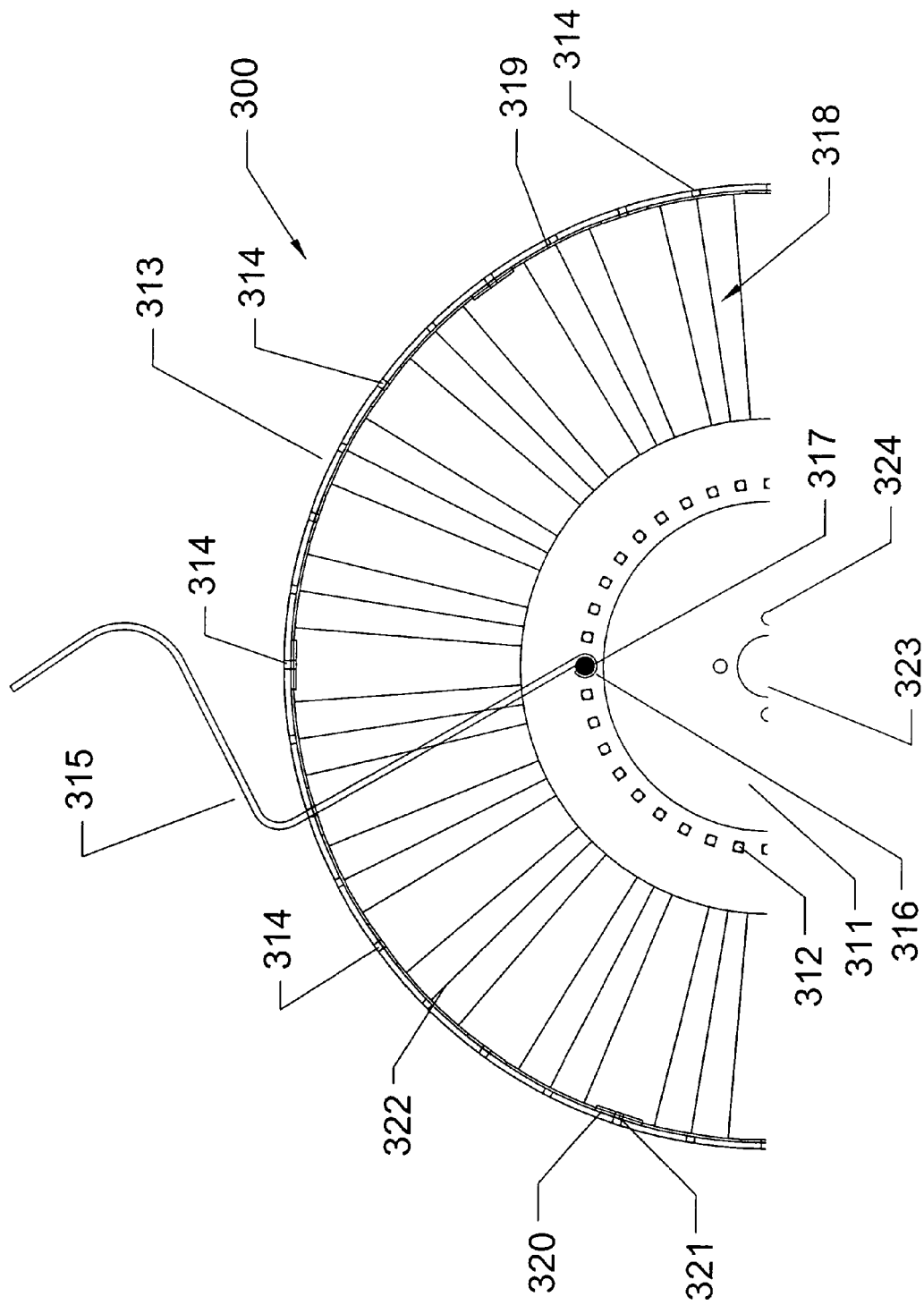
FIG. 25 illustrate a rake wheel assembly in accordance with the present invention for the right side of a V-rake.
Figure 26:
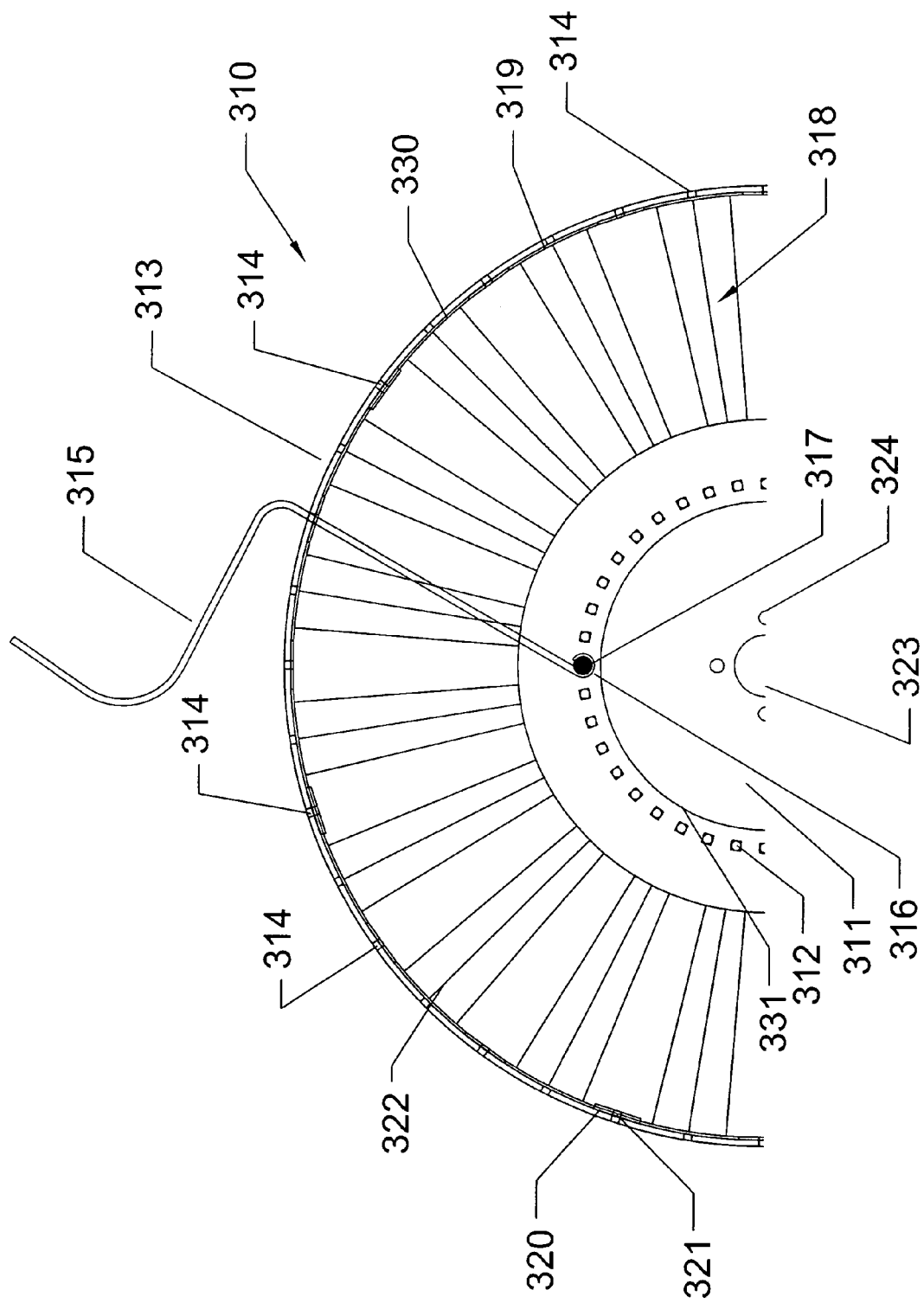
FIG. 26 illustrate a rake wheel assembly in accordance with the present invention for the left side of a V-rake.

Rake wheel assemblies 300, 310 in accordance with the present invention are illustrated in FIGS. 25 and 26. Wheel assembly 300 in FIG. 25 is identical to wheel assembly 310 in FIG. 26 except that one is a mirror image of the other. These wheel rake assemblies 300, 310 are for use on the left and the right sides respectively of the wheel rake 10, 110, 210. The rake wheel assembly 300, 310 includes a center disk 311 having a predetermined radius and holes 312 substantially equally spaced around its outer edge or periphery, and an outer ring 313 having an equal number of substantially equally spaced holes 314 around its periphery. The ring 313 has a substantially rectangular cross-section with the larger side facing the center of the ring 313. The center disk 311 is adapted to be mounted on a hub 200, as shown in FIG. 17. The hub 200, which passes through an opening 323 in the center disk 311, includes a flange on which are located bolts that pass through holes 324 to be fastened with nuts in a conventional manner.

Rake tines 315, which may take on various conventional shapes such as the Z-shape that is illustrated, slide through the holes 314 in the outer ring 313 of the rake wheel assembly 300, 310 and are bolted to the heavier center disk 311. A loop 316 is formed into the end of the rake tine 315 to accept a bolt 317. Holes 312 are preferably square holes for receiving carriage bolts 317 that will be prevented from turning when corresponding nuts are tightened. A bolt 317 is placed in each hole 312 to receive the loop 316 of a single tine 315 and is fixed in place by a nut. The loop 316 wraps around the bolt 317 to prevent the tine 315 from jarring loose under heavy raking conditions. One feature of the rake wheel assembly 300, 310 is that rake tines 315 are individually fixed to the center disk 311 of the rake wheel assembly 300, 310. This feature simplifies assembling the rake wheel assembly 300, 310 and also the replacement of a tine 315.

Another feature of the rake wheel assembly 300, 310 in accordance with the present invention is an integrated windguard 318. The windguard 318 is an annulus or disk 319 made from a light gauge galvanized metal. The radius of an outer periphery 330 of the annulus 319 is substantially equal to the inner radius of the outer ring 313 and an inner radius 331 of the annulus 319 is smaller than the radius of the center disk 311. The windguard 318 further has tabs 320 equally spaced around the periphery of the annulus 319. The tabs 320 are substantially perpendicular to the surface of the annulus 319 and fit inside the outer ring 313 of the rake wheel assembly 300, 310. The tabs 320 further have holes 321 that line up with the holes 314 in the outer ring 313. In this particular embodiment, there is a tab 320 adjacent every second hole 314 in the outer ring 313; however, tabs 320 may be located at every hole 314 or even less frequently such as at every fourth hole 314.

The annulus 319 further includes holes around its inner periphery such that the holes match the holes 312 in the center disk 311. In this way, the windguard 318 is attached to the center disk 311 of the rake wheel assembly 300, 310 by the same bolts 317 that hold the rake tines 315 to the center disk 311. To add rigidity to the annulus 319, indentations 322 are stamped into it.

Figure 27:
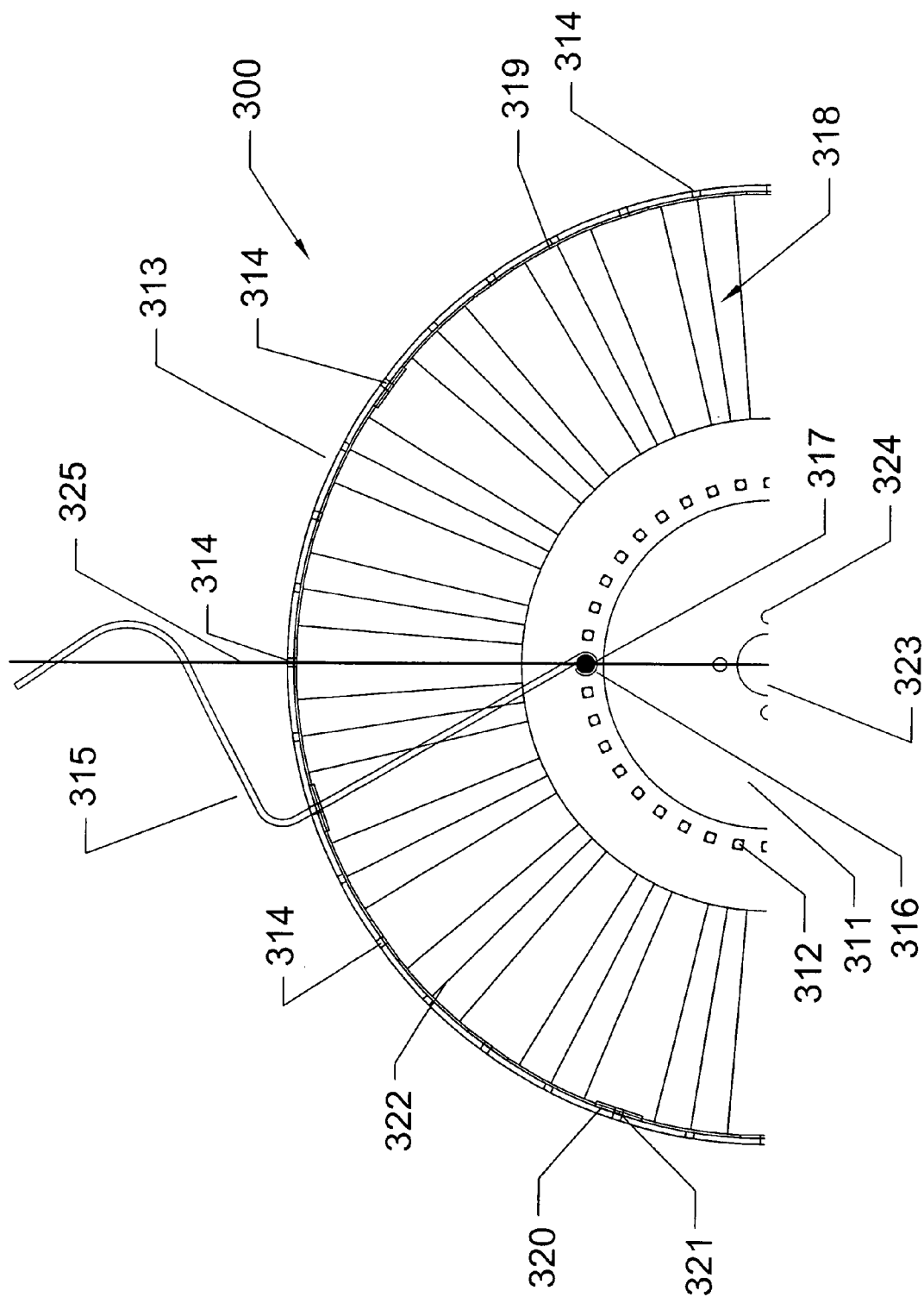
FIGS. 27, 28 and 29 illustrate the assembling procedure for the wheel rake assembly.
Figure 28:
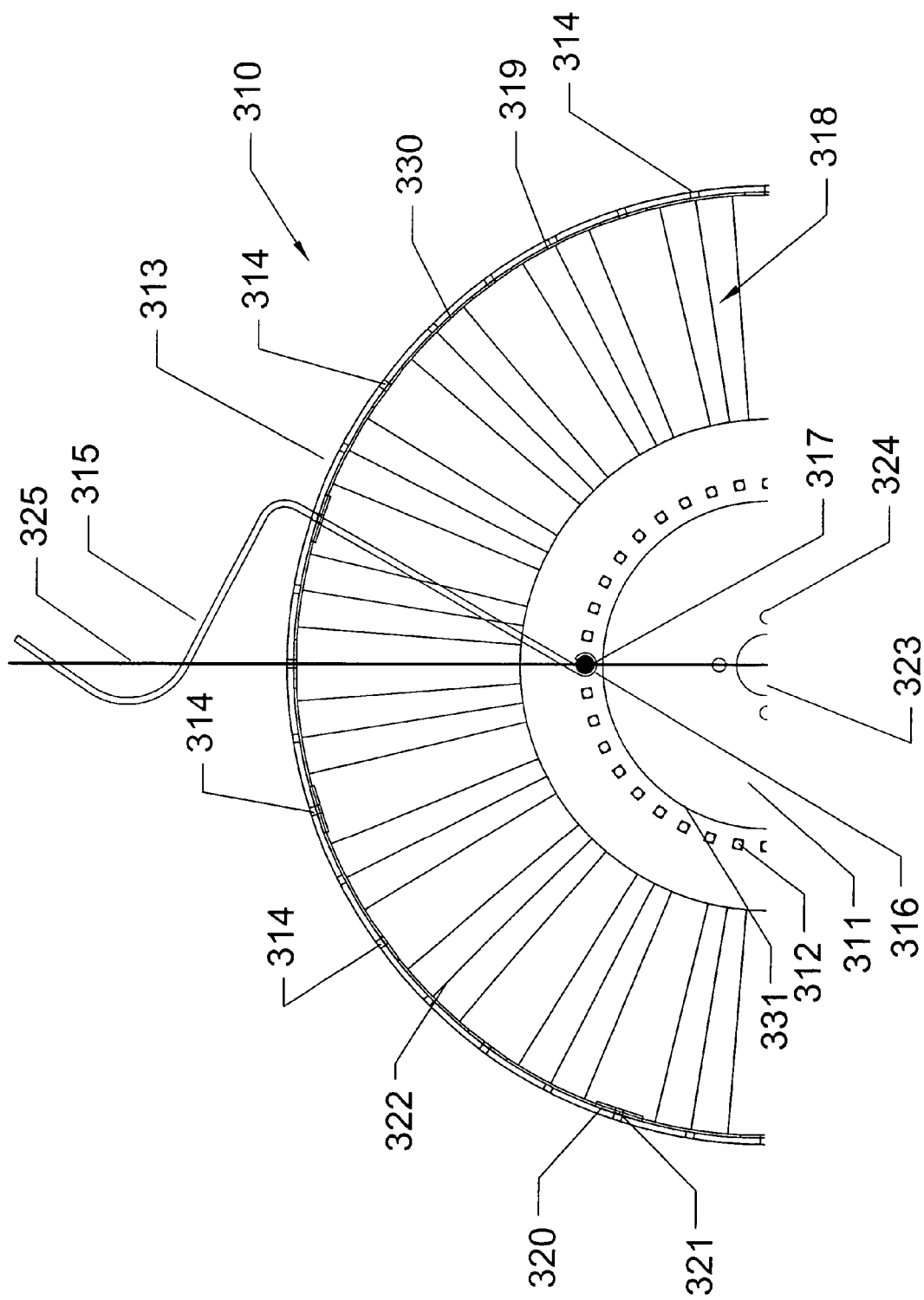
Figure 29:
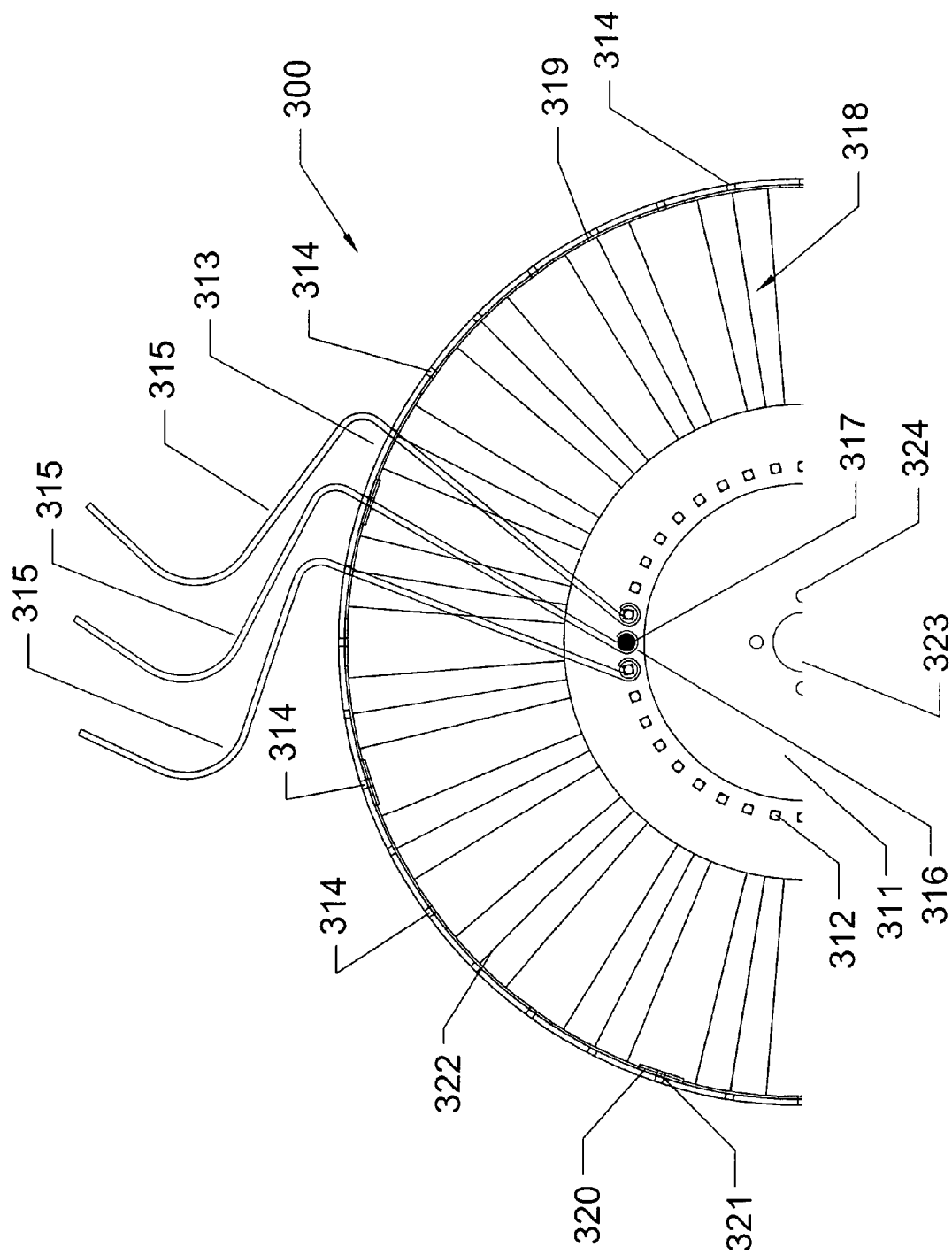

FIGS. 27 to 29 show the assembly procedure for the rake wheel assembly 300, 310. The first step is to align the center disk 311, windguard 318, and outer ring 313 in the 12:00 o'clock position as shown. In FIGS. 27 and 28, a straight rod 325 is used as a reference. When in the 12:00 o'clock position, the rod 325 will pass over the bolt hole loop 316 on the tine 315. In this position, the rake tine 315 must pass through the outer ring 313 two holes 314 to the left of the rod 325. This gives the orientation of the tine 315 on the rake wheel assembly 300, 310. If the rake wheel assemblies 300, 310 are to be used on a "V" style rake, both left and right rake wheel assemblies 300, 310 are required. Assembling both rake wheel assemblies 300, 310 is the same except that the first tine 315 must pass through a hole 314 two holes 314 to the right of vertical rod 325 for the opposite rake wheel assembly 300, 310, as shown in FIG. 28. The rake wheel assemblies 300, 310 illustrated in FIGS. 26 and 27 would be used on the right side of a "V" style rake and the rake wheel assemblies 300, 310 illustrates in FIGS. 26 and 28 would be used on the left side of a "V" style rake.

FIG. 29 illustrates how the remaining tines 315 are bolted in side by side to complete the rake wheel assembly 300, 310. With this method, the windguard 318 is securely attached to the rake wheel assembly 300, 310 with no welding or painting required. Because the windguard 318 is integrated into the rake wheel assembly 300, 330, the windguard 318 adds strength and durability to the rake wheel assembly 300,330.

Because the windguard 318 gives the front of the rake wheel assembly 300, 310 a smooth surface, the raked material has nothing to catch onto and therefore it will not wrap, and the windguard 318 prevents the raked material from wrapping on the rake wheel assembly 300, 310 in windy conditions.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A V-rake comprising:
a tow beam having a front end adapted to be connected to a towing vehicle and a back end;
a back section connected to the back end of the tow beam;
first and second rake booms each having a front end and a back end, the back end of the first rake boom being pivotally connected to a first pivot box, the back end of the second rake boom being pivotally connected to a second pivot box, the first and second pivot boxes pivotally connected to the back section such that the front ends of the booms can be swung between a transport position wherein the rake booms are generally parallel to the tow beam and an operating position wherein the rake booms are positioned at a predetermined angle to the tow beam;
a number of rake wheels mounted on each of the rake booms on a side of the boom nearest to the tow beam, the rake wheels adapted to move vertically with respect to the rake boom;
the first and second boxes each having a predetermined width between one side and another side of the pivot box, the one side of the first pivot box being pivotally connected to the back section and the first rake boom being pivotally connected to the other side of the first pivot box, the one side of the second pivot box being pivotally connected to the back section and the second rake boom being pivotally connected to the other side of the second pivot box; and
a pivot box control mechanism for moving the other sides of the pivot boxes towards and away from one another to change the distance between the back ends of the rake booms.

2. A V-rake as claimed in claim 1 wherein the back section comprises:
first and second vertical beams each having lower and upper ends;
a horizontal beam fixed between the upper ends of the first and second vertical beams; wherein the one side of the first pivot box is pivotally connected to the first vertical beam between the lower and upper ends and the one side of the second pivot box is pivotally connected to the second vertical beam between the lower and upper ends.

3. A V-rake as claimed in claim 2 wherein the pivot box control mechanism comprises:
a horizontal control beam fixed between the first and second vertical beams and below the horizontal beam;
a sleeve slidably mounted on the horizontal control beam;
first and second linkages pivotally connected between the sleeve and the other sides of the pivot boxes; and
a hydraulic cylinder connected between the sleeve and the tow beam to control the movement of the sleeve along the horizontal control beam.

4. A V-rake as claimed in claim 2 wherein the back section comprises a wheel assembly for supporting the back section.

5. A V-rake as claimed in claim 4 wherein the wheel assembly comprises a first wheel rotatably fixed to the lower end of the first vertical beam and a second wheel rotatably fixed to the lower end of the second vertical beam.

6. A V-rake as claimed in claim 4 wherein the wheel assembly comprises a first set of tandem wheels pivotally fixed to the lower end of the first vertical beam and a second set of tandem wheels pivotally fixed to the lower end of the second vertical beam.

7. A V-rake as claimed in claim 6 wherein each set of tandem wheels comprises:
a wheel carriage; and
a pair of wheels mounted by axles onto the carriage such that the wheels are in parallel and staggered front to back relative to one another, wherein the front wheel is positioned on the inside of the V-rake and the back wheel is positioned on the outside of the V-rake.

8. A V-rake as claimed in claim 7 wherein the carriage is pivotally fixed to the vertical beam at a pivot point, wherein a distance between the pivot point and the axle of the front wheel is greater than a distance between the pivot point and the axle of the back wheel.

9. A V-rake as claimed in claim 1 comprising a rake wheel arm for each of the rake wheels, having one end adapted to be pivotally connected to the rake boom and another end having a spindle for receiving a rake wheel of the rake wheels.

10. A V-rake as claimed in claim 9 comprising a spring assembly connected to the rake wheel arm and adapted to permit the rake wheel to move vertically with respect to the rake boom.

11. A V-rake as claimed in claim 10 comprising a wheel lift rod connected to the spring assembly for raising and lowering the rake wheel.

12. A V-rake as claimed in claim 11 wherein the wheel lift rod is hydraulically actuated.

13. A V-rake as claimed in claim 10 wherein the spring assembly includes a tension spring.

14. A V-rake as claimed in claim 10 wherein the spring assembly includes a compression spring.

15. A V-rake as claimed in claim 10 wherein the spring assembly comprises:
a compression spring having first and second ends;
a plug fixed to the first end of the spring;
an insert fixed to the second end of the spring, the insert having an arm extending from the insert;
a rod having a first end and a second end, positioned within the compression spring, wherein the first end is fixed to the plug and the second end extends out of the second end of the spring through the insert, such that the insert slides freely on the rod, the second end of the rod adapted to be connected to a mechanism to control its movement; and
a further arm having first and second ends, the first end fixed to the rake wheel arm and the second end pivotally connected to the insert arm, whereby the compression spring permits the rake wheel to move vertically to follow a terrain contour.

16. A V-rake as claimed in claim 11 wherein the spring assembly comprises:
a compression spring having first and second ends;
a plug fixed to the first end of the spring;
an insert fixed to the second end of the spring, the insert having an arm extending from the insert;
a rod having a first end and a second end, positioned within the compression spring, wherein the first end is fixed to the plug and the second end extends out of the second end of the spring through the insert, such that the insert slides freely on the rod, the second end of the rod is connected to the wheel lift rod; and a further arm having first and second ends, the first end fixed to the rake wheel arm and the second end pivotally connected to the insert arm, whereby the compression spring permits the rake wheel to move vertically to follow a terrain contour.

17. A V-rake as claimed in claim 1 wherein the rake wheel comprises:
   a center disk having a predetermined radius adapted to be mounted on a hub;
   a number of rake tines;
   an outer ring having a substantially greater radius then the center disk and having holes at least equal to the number of rake tines, the holes being spaced about and passing radially through the outer ring, whereby each of the tines is positioned in a hole in the outer ring with one end of each tine fixed to the center disk.

18. A V-rake as claimed in claim 17 wherein the center disk has holes at least equal in number to the rake tines spaced about its periphery for receiving fasteners to individually fix the tines to the center disk.

19. A V-rake as claimed in claim 17 wherein the outer ring has a substantially rectangular cross-section with a larger side of the rectangular cross-section facing the center of the outer ring.

20. A V-rake as claimed in claim 17 comprising a windguard positioned between the center disk and the outer ring.

21. A V-rake as claimed in claim 20 wherein the windguard comprises an annulus having an outer radius approximately equal to the radius of the outer ring and an inner radius smaller than the radius of the center disk so as to overlap with the center disk, an inner periphery of the annulus having holes that match with holes in the center disk, and an outer periphery of the annulus having tabs with holes that match with some of the holes in the outer ring, the tabs being substantially perpendicular to the surface of the annulus, whereby rake tines are located in the outer ring holes and matching tab holes.

22. A V-rake as claimed in claim 21 wherein the holes in the center disk are at least equal in number to the rake tines, spaced about its periphery for receiving fasteners to individually fix the tines and the windguard to the center disk.

23. A V-rake as claimed in claim 20 wherein the windguard is a light gauge galvanized metal with stamped indentations.

24. A V-rake as claimed in claim 1 wherein the tow beam comprises:
   a main beam section comprising the tow beam back end connected to the back section;
   a goose-neck section connected to the main beam section; and
   a hitch connected to the goose neck section.

25. A V-rake as claimed in claim 24 wherein the main beam section and the goose neck sections each include a beam, a truss support and truss plates connecting the beam to the truss support.

26. A V-rake as claimed in claim 1 wherein the front end of each rake boom comprises a castor wheel for supporting the rake boom.

27. V-rake as claimed in claim 26 wherein the rake booms include castor extensions fixed to the front end of the booms for mounting the castor wheels.

28. V-rake as claimed in claim 1 wherein the rake booms include boom extensions for elongating the rake booms.

29. A V-rake as claimed in claim 28 wherein at least one additional rake wheel is mounted on each of the boom extensions.

30. A V-rake as claimed in claim 1 wherein the rake booms include a hinged section for providing flexibility to the rake boom.

31. A V-rake as claimed in claim 30 wherein a castor wheel is mounted on each of the hinged sections of the rake booms.

32. A V-rake as claimed in claim 26 wherein the castor wheel includes a braking mechanism to stabilize the castor wheels.

33. A V-rake as claimed in claim 1 further comprising a control mechanism connected between the tow beam and the booms to pivot the booms between the operating position and the transport position.

34. A V-rake as claimed in claim 33 wherein the control mechanism for positioning the rake booms comprises:
   a first sleeve slidably mounted on the tow beam towards the back end of the tow beam;
   a second sleeve slidably mounted on the tow beam towards the front end of the tow beam;
   a first pair of scissor arms pivotally connected between the first and second rake booms and the first sleeve;
   a second pair of scissor arms pivotally connected between the first and second rake booms and the second sleeve; and
   a sleeve moving mechanism for changing the distance between the first and the second sleeve.

35. A V-rake as claimed in claim 34 wherein the sleeve moving mechanism is a hydraulic cylinder having one end fixed to the tow beam and another end connected to one of the first sleeve and the second sleeve.

36. A V-rake as claimed in claim 34 herein the sleeve moving mechanism is a hydraulic cylinder having one end connected to the first sleeve and another end connected to the second sleeve.

37. A V-rake comprising:
   a tow beam having a front end adapted to be connected to a towing vehicle and a back end:
   a back section connected to the back end of the tow beam;
   first and second rake booms each having a front end and a back end, the back end of each rake boom being pivotally connected to the back section such that the front ends of the booms can be swung between a transport position wherein the rake booms are generally parallel to the tow beam and an operating position wherein the rake booms are positioned at a predetermined angle to the tow beam;
   a number of rake wheels mounted on each of the rake booms on a side of the boom nearest to the tow beam, wherein the rake wheels are adapted to move vertically with respect to the rake boom; and
   wherein the back section comprises:
      first and second vertical beams each having lower and upper ends, the rake booms being pivotally connected to the vertical beams between their lower and upper ends;
      a first horizontal beam having one end fixed to the upper end of the first vertical beam and a second horizontal beam having one end fixed to the upper end of the second vertical beam such that the other ends of the horizontal beams are positioned end to end;

a third horizontal beam positioned adjacent and aligned vertically with the first and second horizontal beams, the tow beam being fixed substantially to the center of the third horizontal beam;

a width control mechanism connected between the third horizontal beam and the first and second horizontal beams adapted to move the first and second horizontal beams in a direction parallel to the third horizontal beam to change the distance between the first and second vertical beams.

\* \* \* \* \*